United States Patent [19]

Ament et al.

[11] Patent Number: 5,722,525
[45] Date of Patent: Mar. 3, 1998

[54] MOTOR VEHICLE FRICTION CLUTCH WITH A TORSIONAL VIBRATION DAMPER, AND A TORSIONAL VIBRATION DAMPER FOR A MOTOR VEHICLE FRICTION CLUTCH

[75] Inventors: Norbert Ament, Eltingshausen; Reinhard Feldhaus, Oerlenbach; Joachim Lindner, Schweinfurt; Klaus Memmel, Gädheim; Jörg Sudau, Niederwerrn; Michael Weiss, Dittelbrunn, all of Germany

[73] Assignee: Fichtel & Sachs AG, Schweinfurt, Germany

[21] Appl. No.: 405,137

[22] Filed: Mar. 16, 1995

[30] Foreign Application Priority Data

Mar. 18, 1994 [DE] Germany ............... 44 09 254.7

[51] Int. Cl.[6] ..................................... F16D 3/66
[52] U.S. Cl. ............... 192/70.17; 74/572; 192/204; 464/63
[58] Field of Search ............... 74/572, 573 R, 74/574; 192/70.16, 204, 207, 212, 214; 464/63, 64, 69

[56] References Cited

U.S. PATENT DOCUMENTS

| | | | |
|---|---|---|---|
| 4,453,838 | 6/1984 | Loizeau | 384/125 |
| 4,548,309 | 10/1985 | Braun | 192/106.2 |
| 4,643,288 | 2/1987 | Tomm et al. | 192/106.2 |
| 4,787,877 | 11/1988 | Nagao et al. | 192/106.2 X |
| 4,789,053 | 12/1988 | Fischer et al. | 192/106.2 |
| 4,890,712 | 1/1990 | Maucher et al. | 192/106.2 |
| 5,209,334 | 5/1993 | Fischer et al. | 192/106.2 |
| 5,240,458 | 8/1993 | Linglain et al. | 464/63 |
| 5,246,398 | 9/1993 | Birk et al. | 464/63 |

FOREIGN PATENT DOCUMENTS

| | | |
|---|---|---|
| 3248119 | 6/1984 | Germany. |
| 2149476 | 6/1985 | United Kingdom. |
| 2166517 | 5/1986 | United Kingdom. |

*Primary Examiner*—Vinh T. Luong
*Attorney, Agent, or Firm*—Nils H. Ljungman and Associates

[57] ABSTRACT

Torsional vibration damper for a motor vehicle friction clutch, the torsional vibration damper having a hub with a hub disc, and cover plates located one on either side of the hub disc, which cover plates are fastened together. The cover plates can be rotated with respect to the hub disc against the force of springs by a specified amount, whereby the radial guidance of the parts which can rotate in relation to one another is provided by preferably one cover plate and a bearing element inserted in a central hole of the cover plate. The bearing element permits a limited radial relative movement of the cover plate with respect to the hub, is designed so that in addition to an axial offset, it can also compensate for an angular offset between the crankshaft and the transmission shaft.

21 Claims, 15 Drawing Sheets

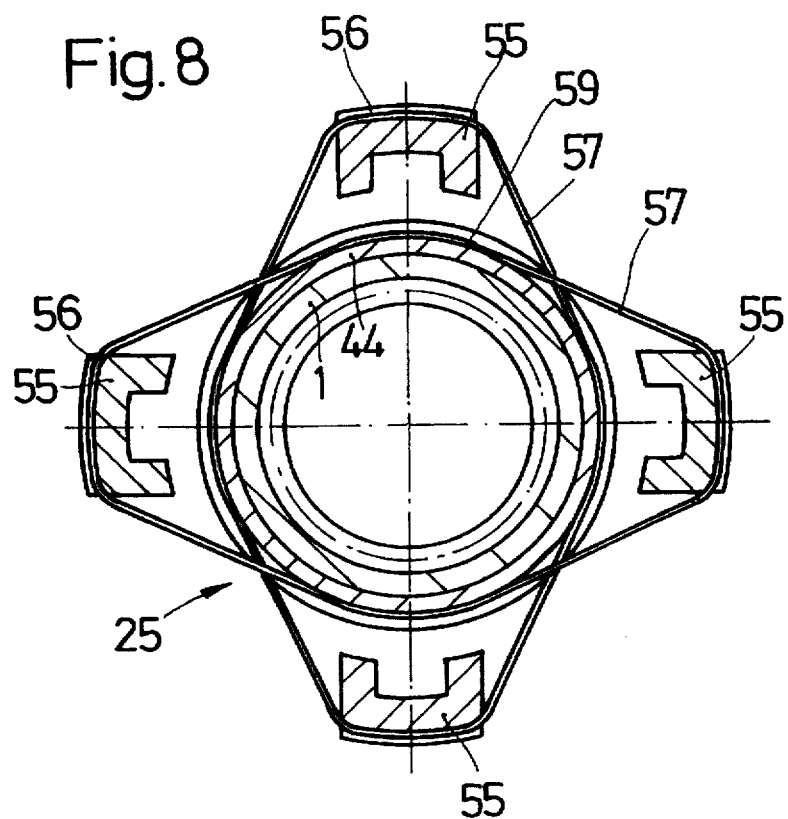

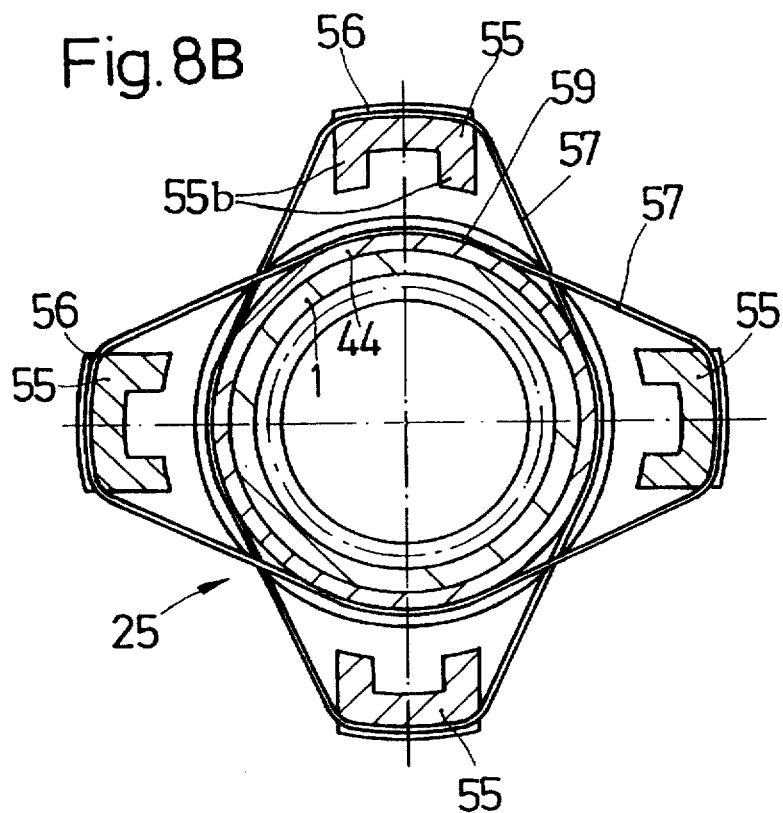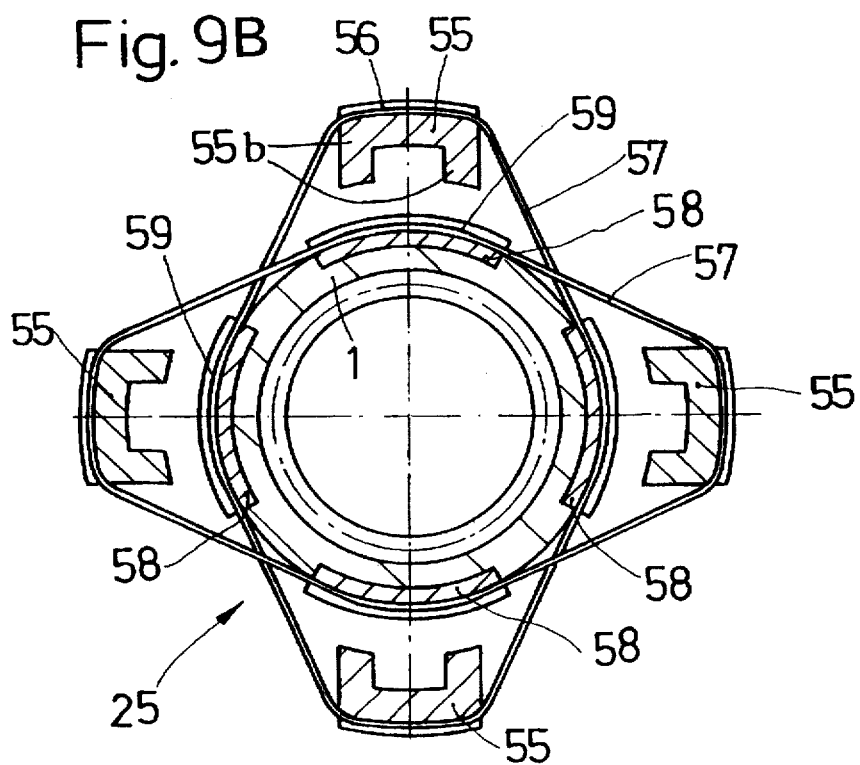

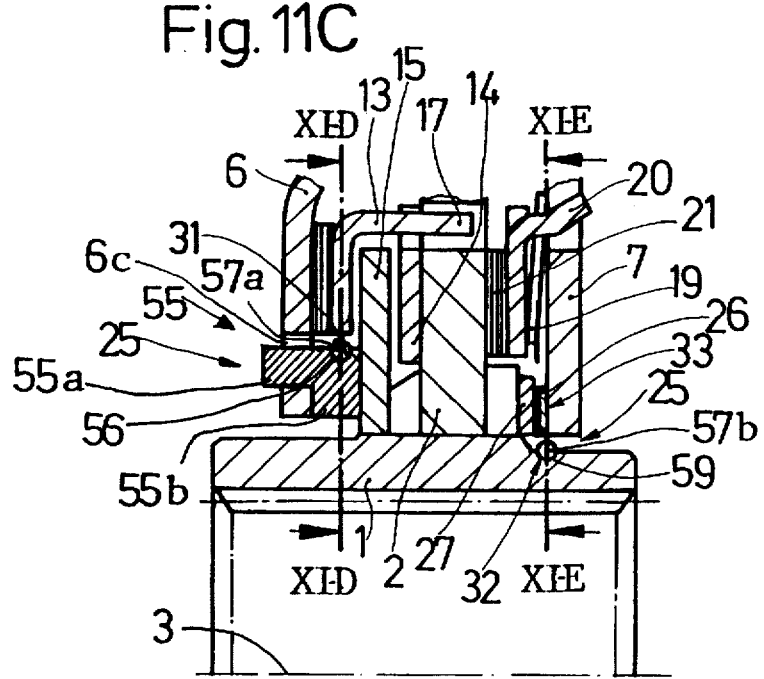
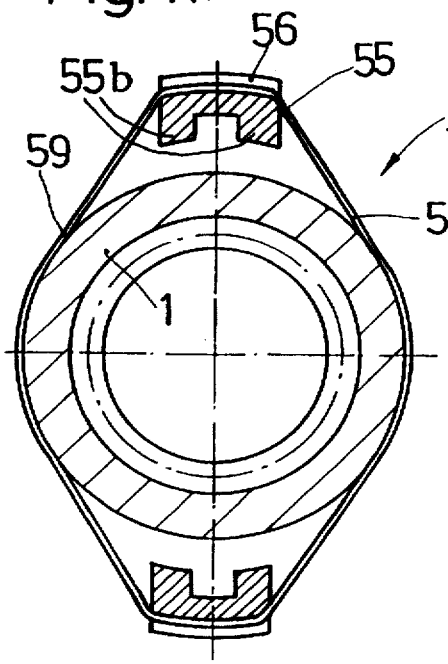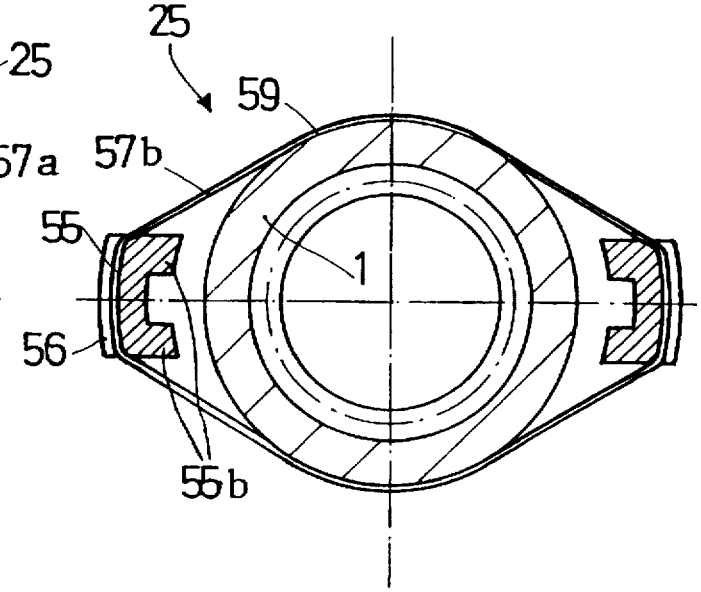

MOTOR VEHICLE FRICTION CLUTCH WITH A TORSIONAL VIBRATION DAMPER, AND A TORSIONAL VIBRATION DAMPER FOR A MOTOR VEHICLE FRICTION CLUTCH

BACKGROUND OF THE INVENTION

1. Field of the Invention

The present invention generally relates to a torsional vibration damper for a motor vehicle friction clutch. The torsional vibration damper can generally include a hub with a hub disc, and cover plates located one on either side of the hub disc. The cover plates can be non-detachably fastened together, and can be rotated by a specified amount with respect to the hub disc against the force of springs, whereby the radial guidance of the parts which can rotate in relation to one another can be provided by at least one of the cover plates and a bearing element inserted in a central hole in the cover plate. The bearing element can permit a limited relative radial movement of the cover plate with respect to the hub and can also compensate for angular movements of the hub with respect to the cover plates.

2. Background Information

German Patent No. 32 48 119 C2, FIG. 5, discloses such a bearing element, on which bearing element one of the cover plates, by means of its inner end, is supported on one leg of a two-leg lock washer. This inner end of the cover plate is bent away from the hub disc. The lock washer is supported by means of its other leg on the hub and on the shoulder of the hub disc. By means of this lock washer, the bearing element, on account of its flexibility in the radial direction, makes it possible to compensate for a radial axial offset, or a radial axis offset, between the crankshaft of a motor vehicle which is in a driving connection with the cover plate, and the transmission shaft on which the hub is located.

If there is an axial offset between the crankshaft and the transmission shaft, with an otherwise parallel orientation of the two shafts, the lock washer, which is flexible in the radial direction, may suffice to compensate for this axial offset. But in the much more common case in which the crankshaft and the transmission shaft run at an angular offset with respect to one another, the lock washer will typically fail. The consequence of this failure can be a severe and undesirable increase in friction caused by the high edge pressure on the components of the torsional vibration damper, which components would then be oriented at an angle in relation to one another.

OBJECT OF THE INVENTION

The object of the present invention is therefore to design a torsional vibration damper such that, in addition to compensating for radial axis offsets between the crankshaft and the transmission shaft, angular offsets between these two elements can also be compensated for.

SUMMARY OF THE INVENTION

The present invention teaches that this object can be accomplished by designing the bearing element, in at least each of the areas of contact with the hub and the cover plate, with a support having a convex curvature in the axial direction of the hub, to provide for a change in the angle of the bearing element with respect to the cover plate, and then angle of the hub with respect to the bearing element. This convex curvature of the bearing element can interact with an axial retaining device which limits an axial displacement of the bearing element with respect to the cover plate and hub during this change of angle. The axial retaining device can be realized on at least one of the two contact elements, i.e. one of the cover plates or the hub.

The bearing element can preferably have inner and outer supports each having this convex curvature in the axial direction of the hub, and these curvatures can preferably make possible a change in the angle of the outer support with respect to the cover plate, as well as a similar change in the angle of the hub on the inner support. It can thereby become possible to adjust the hub by means of the bearing element with respect to the cover plate, so that the axes of the cover plate and the hub are oriented at an angle in relation to one another. In this manner, even rather large angular offsets can be achieved between the cover plate and the hub, which angular offsets can be caused by an angular offset between the crankshaft and the transmission shaft of a motor vehicle. In order to perform this function, the bearing element can preferably be engaged both with the cover plate on the crankshaft side, and also with the cover plate on the transmission side, in accordance with one embodiment of the present invention.

By means of the orientation of the hub relative to the cover plates, tipping of the functional elements of the torsional vibration damper located on the hub with respect to the cover plates can preferably be prevented. Thus, a particularly low-friction transmission of torque by means of the clutch becomes possible, since friction losses, which essentially always occur due to such tipping, can be prevented. Consequently, the torsional vibration damper can be effective essentially only with the desired friction, so that bending vibrations on the crankshaft or on the transmission shaft can be optimally compensated for, even in the event of an angular offset between these shafts.

Since there is essentially always a component of motion in the axial direction, for a change in the angle of the hub relative to the cover plates, the axial retaining device should prevent any axial movement of the bearing element beyond a specified proportional movement in order to guarantee the reliability and safety of the torsional vibration damper.

As a function of the respective configuration of the bearing element, the bearing element can preferably either be radially elastically deformable, or can be designed with a radial clearance with respect to the cover plate and/or the hub. Thus, the compensation for a radial axis offset between the cover plate and hub can also be essentially guaranteed.

The change in the angle of the hub in relation to the cover plates can take place against the action of a restoring means, so that as soon as the amount of the angular offset is changed, there can be an essentially automatic centering of the hub to adjust to the new angular offset. The restoring means can preferably be engaged on one end on the hub, and on the other end on one of the cover plates.

In accordance with one embodiment, the restoring means can preferably work with the axial retaining device. The axial retaining device can preferably be formed by a guide provided on the radially inner end of one of the cover plates, which guide can be utilized to locate the bearing element in its radially outer area. Alternatively, the axial retaining device can preferably be in the form of an extension on the bearing element, which extension can preferably be engaged in a recess in the hub.

In accordance with one embodiment of the bearing element, the bearing element can have a hemispherically-shaped support. Thus, the bearing element can have an almost point-like contact area with the guide in the cover plate, and can be moved in essentially any direction in the ball socket of the hub. This configuration essentially means that the number of degrees of freedom can preferably be as large as possible, and the influence of friction at these contact areas can preferably be minimal. On account of the arrangement of the corresponding supports, which can be offset from one another by about 180 degrees, there can be a first pivoting direction of the bearing element by means of the outer supports, and a second pivoting direction by means of the inner supports. When the two pairs of supports are each offset from one another by about 90 degrees, these two pivoting directions can be offset from one another by about 90 degrees, so that the bearing element can preferably execute angular excursions in either of the two directions arbitrarily, when there is a superimposition of movements. The excursion angle is typically limited by the amount of clearance remaining between the ring of the bearing element and the hub or the cover plate, unless the axial retaining device is active at an even smaller excursion angle. As a result of this clearance, radial axis offsets between the cover plate and the hub can also be compensated for.

In accordance with one embodiment, the hub can preferably be configured with an axial inlet or channel in the vicinity of the engagement of the inner supports of the bearing element. Further, the axial inlet or channel can preferably extend into a bearing point. This configuration of the hub can preferably make it easier to push the bearing element, which is radially constricted by the inner supports at these points, onto the hub during the assembly process.

In one embodiment of the bearing element, the bearing element can preferably be made of a wear-resistant plastic. On account of the use of plastic, the level of friction, which is already low as a result of the hemispheric shape of the supports discussed above, can be reduced even further.

Yet another embodiment of the bearing element involves forming the bearing element as a flexible wire ring. The wire ring can preferably provide a connection between the cover plate and the hub. When a wire ring, preferably one with a circular cross section, is used, the curvature in the axial direction is particularly favorable if it is provided in expanded portions of the ring which form the outer supports, and also in ring segments which form the inner supports. As discussed above, this curvature in the axial direction is essentially necessary to compensate for angular offsets between the cover plate and the hub. The compensation for radial axis offsets, on the other hand, can be possible due to the flexible properties of the wire ring.

One embodiment of the present invention includes a hub-side locator, which hub-side locator can preferably be formed on a hub shoulder having ring-halves divided axially. The ring halves can preferably be connected to one another by means of a snap connection. By means of the configuration of the hub shoulder in this manner, the bearing can become easier to assemble. Further, if the ring is made of plastic, the wear can preferably be minimized.

The bearing element, in accordance with an additional embodiment, can include a multiplicity of tension bands, each of which can be guided between two tension elements. Further, between the two tension elements, the tension bands can be guided along the hub, and thus the hub can be elastically braked in the event of excursion movements perpendicular to the connecting axis of the two tension elements. Further, two additional tension elements with a tension band can be provided, which tension elements can preferably be offset by about 90 degrees with respect to the two above-mentioned tension elements. Thus, limited excursions of the hub can preferably be possible in two directions of movement at right angles to one another, and an excellent radial and axial compensation can thereby become possible. In this embodiment of the bearing element too, the hub can be oriented at an angle to the cover plate, and when tension bands with a circular cross section are used, the surface of the tension bands can be used as a support with a curvature running in the axial direction, as discussed above.

The tension elements, and also the hub, can be designed to each have two grooves parallel to one another, which grooves can be used to guide the tension bands. As a result, the two tension bands running at right angles to one another can preferably be guided with the smallest possible distance between them. Since each tension band can essentially only absorb forces in the corresponding direction of action, when a force is introduced with a direction of action which cannot be absorbed by one of the tension bands, this force can be transmitted with only a very small lever arm to the other tension band. In spite of the elasticity of the tension bands, the hub can thereby be reliably centered with respect to the cover plates.

The grooves in the tension elements and hub can each preferably have a circular cross-section which preferably matches the cross-sections of the tension bands. This configuration of the grooves can be particularly advantageous in combination with the cross sectional shape of the tension bands.

In accordance with one embodiment of the hub, the hub can preferably have a hub shoulder with segments arranged at predetermined angular intervals from one another.

An essentially simple embodiment of this bearing element equipped with tension bands involves the use of two tension elements opposite one another on one of the cover plates, and two additional tension elements opposite one another on the other cover plate.

The angular excursion capabilities of the hub relative to the cover plates can be improved if the hub shoulder is secured in the axial direction by an axially outer stop running radially inward of the cover plate, and if the hub shoulder is designed with a spherical portion on its side facing the stop.

The tension bands, in accordance with one embodiment can preferably be formed by coil tension springs, or elastomer rings. In addition, the tension elements and the hub shoulder can preferably be made of plastic.

The bearing element can preferably be formed by an elastic ring and can surround the hub, in accordance with one embodiment, and one side of the ring facing the crankshaft-side cover plate can preferably act as an outer support, and the side of the ring facing the hub can act as an inner support. Such a bearing element can preferably be configured as a thin-walled hose which can be filled with a pressure medium, or alternatively, as an essentially solid elastomer ring.

In accordance with one embodiment of the present invention an angular excursion of the hub with respect to the cover plates preferably does not lead to contact of the functional elements of the torsional vibration damper with one another, because the functional elements can preferably remain separate by mounting at least some of these functional elements in a floating manner in the axial direction.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the invention resides broadly in a friction clutch for a manual transmission of a motor vehicle, the friction clutch comprising: a housing; a clutch plate disposed within the housing, the clutch plate defining an axis of rotation and an axial direction parallel to the axis of rotation; pressure plate apparatus for applying an axial force to the clutch plate, the pressure plate being disposed within the housing and being movable in the axial direction; flywheel apparatus for transferring rotational force from a crankshaft of the motor vehicle to the clutch plate; the clutch plate comprising a torsional vibration damper; the torsional vibration damper comprising: a hub, the hub having apparatus for engaging shaft apparatus of a transmission of the motor vehicle; a hub disc disposed about the hub and extending radially away from the hub, the hub disc having a first side and a second side; a first cover plate disposed adjacent the first side of the hub disc; a second cover plate disposed adjacent the second side of the hub disc; at least one of the first cover plate and the second cover plate comprising friction lining apparatus for engaging with the pressure plate and the flywheel apparatus upon engagement of the friction clutch; the first cover plate and the second cover plate being relatively rotatable about the hub with respect to the hub disc; apparatus for guiding at least one of the first cover plate and the second cover plate with respect to the hub, the apparatus for guiding being disposed between, and making contact with, the at least one of the first cover plate and the second cover plate and the hub; the apparatus for guiding comprising apparatus for compensating for angular displacements of the hub with respect to the at least one of the first cover plate and the second cover plate; and apparatus for axially retaining the apparatus for guiding with respect to the hub and the at least one of the first cover plate and the second cover plate.

BRIEF DESCRIPTION OF THE DRAWINGS

The present invention is explained in greater detail below with reference to the embodiments illustrated in the accompanying drawings, in which:

FIG. 8 shows a section along line VIII—VIII in FIG. 7, with an encircling hub shoulder;

FIG. 8B shows substantially the same view as FIG. 8, but shows additional components;

FIG. 9 shows substantially the same view as FIG. 8, but with hub shoulder segments;

FIG. 9B shows substantially the same view as FIG. 9, but shows additional components;

FIGS. 11C, 11D, and 11E show substantially the same views as FIGS. 11, 11A and 11B, respectively, but show additional components.

DESCRIPTION OF THE PREFERRED EMBODIMENT

Figure 1:
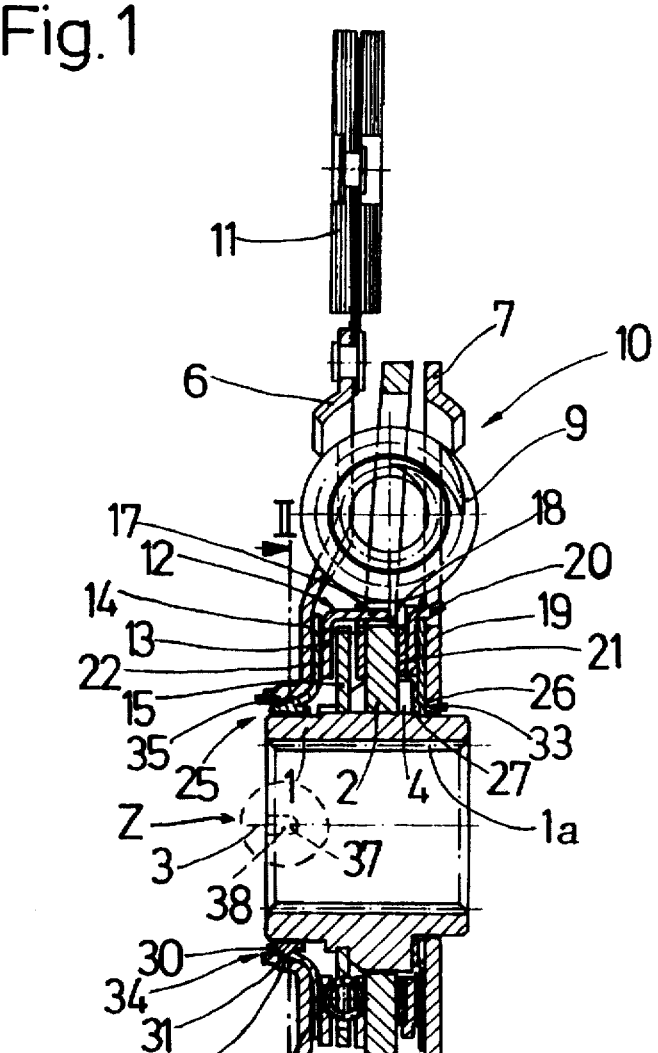
FIG. 1 shows a torsional vibration damper in longitudinal section, whereby there is a bearing element between the cover plate and the hub in the form of a ring surrounding the hub with clearance.
Figure 2:
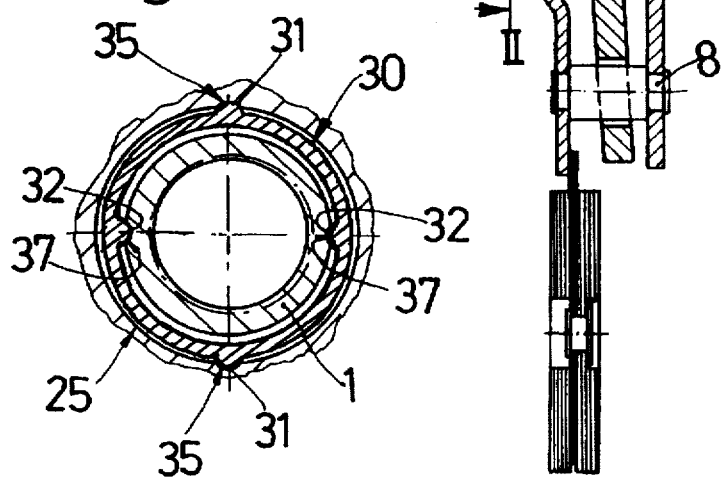
FIG. 2 shows a section along Line II—II in FIGS. 1 and 1A, in partial cross section.

FIG. 1 shows a torsional vibration damper with a hub 1 having an axis of rotation 3. In accordance with at least one embodiment, this torsional vibration damper can also be considered to represent a clutch plate or clutch disc. The torsional vibration damper can preferably be mounted non-rotationally, but so that it can move axially, on a transmission shaft 104 (see FIG. 1A), preferably by means of teeth 1a. The hub 1 can preferably have a hub disc 2, which hub disc 2 can be non-rotatably fastened to the hub 1. The torsional vibration damper can preferably be circumferentially connected to the hub disc 2 with rotational clearance by means of gearing 4. On both sides of the hub disc 2 there can preferably be cover plates 6 and 7, which cover plates 6, 7 are preferably non-rotationally connected to one another in the vicinity of their outside diameter by means of connecting rivets 8. In apertures or windows of the cover plates 6 and 7 and of the hub disc 2, there can preferably be coil springs 9 which form a load spring device 10.

Friction linings 11, preferably for engaging with a flywheel (not shown here but see FIG. 1A) of an internal combustion engine of a motor vehicle, can preferably be fastened on the outside circumference of the cover plate 6. Between the hub disc 2 and the cover plate 6, there is an idle damping device 12, which idle damping device 12 can include two additional cover plates 13 and 14, an additional hub disc 15 which is non-rotationally fastened to the hub 1, and additional coil springs 16. The outer cover plate 13, in the vicinity of its outside circumference, radially outside the coil springs 16, can preferably have tabs 17 which are bent in the axial direction towards cover plate 7. The tabs 17 can preferably project into recesses 18 of the hub disc 2, where the tabs 17 can create a clearance-free rotational connection, circumferentially, preferably between the cover plate 13 and the hub disc 2. The same tabs 17 can also preferably define the circumference of the cover plate 14, which cover plate 14 can preferably be located radially inward from the tabs 17.

Viewed in the axial direction, the cover plate 13 can preferably be in contact by means of support edges (not shown) on the cover plate 14, and both cover plates 13, 14 can preferably be supported axially on the hub disc 2. In this case, the axial support force can be generated by a spring plate 19 located between the cover plate 7 and an angle ring 20. The angle ring 20 can preferably be connected non-rotationally, but axially displaceably, to the cover plate 7, and can push, or apply a pressure to, a friction ring 21. The friction ring 21 can preferably be supported on the hub disc 2. It should be noted that the components discussed immediately hereinabove can best be seen in FIG. 4. The axial force of the spring plate 19 can preferably be transmitted via the cover plate 7 and the connecting rivets 8 to the cover plate 6, and from the cover plate 6 via a friction ring 22 to the outer cover plate 13 of the idle spring device 12. Therefore, seen in the axial direction, this system is essentially self-contained.

Radial guidance of the rotating functional elements can preferably be provided by means of a bearing element 25, which bearing element 25 can be inserted into the cover plate 6. The bearing element 25 can be pressurized by a spring 26, which spring 26 is supported on one end by means of a spacer ring 27 on the hub 1, and on the other end on the cover plate 7. As mentioned above, these elements can also best be seen in FIG. 4. The hub 1, together with the spring 26, the bearing element 25, and the spacer ring 27, can thereby form a friction device with a low coefficient of friction which is active over essentially the entire range of angular rotation, and which friction device preferably generates the friction essentially only in the idle range. In the load range, in addition to this friction force, there can preferably be an additional friction force which can be generated by the two friction rings 21 and 22 and the spring plate 19.

Figure 2A:
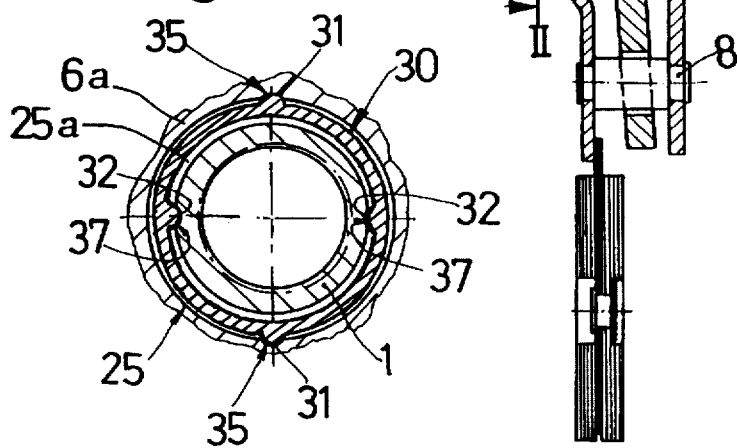
FIG. 2A shows substantially the same view as FIG. 2, but shows additional components.

As shown in FIGS. 1 to 4, the bearing element 25 can preferably be formed by a ring 30 which can surround the hub 1 with a clearance 25a (see FIG. 2A). The bearing element 25 can preferably have outer supports 31 on its outside diameter, each outer support 31 being offset by about 180 degrees from one another, and inner supports 32 on its inside diameter, each inner support 32 being offset by about 90 degrees with respect to the outer supports 31 (see FIGS. 2 and 2A). The outer supports 31 and the inner supports 32 can preferably be hemispheric in shape, and the outer supports 31 can be engaged in a guide 35 formed in the cover plate 6 on its radially inner end 6a (see FIG. 2A). The guide 35 can preferably extend around the cover plate 6 generally in a ring shape, and the guide 35 can have a cross section which essentially matches the shape of the outer supports 31.

Figure 3:
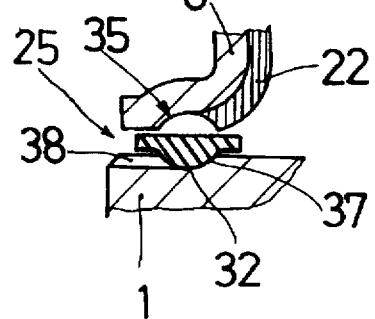
FIG. 3 shows a detail Z of the bearing element, shown rotated by 90 degrees in relation to FIGS. 1 and 1A.

The guide 35 shown in FIG. 1 can alternatively be formed by the cover plate 6 in combination with the friction ring 22, which friction ring 22 is preferably in axial contact with the cover plate 6. This embodiment of the guide 35 is shown in FIG. 3, wherein FIG. 3 shows a detail (Z) of the bearing element 25 of FIG. 1 rotated by about 90 degrees with respect to the view shown in FIG. 1. In either case, the guide 35 can preferably serve to function as an axial retaining device 34 for the bearing element 25.

There can preferably be an axial inlet or channel 38 for receiving each of the inner supports 32 of the bearing element 25, which inlet or channel 38 has a cross sectional shape which essentially matches the shape of the inner supports 32. The axial inlet 38 can preferably extend into a corresponding bearing point 37 which, as illustrated in FIG. 3, can be designed in the shape of a spherical segment or semi-sphere. The inner supports 32 of the bearing element 25, after they have been moved along the corresponding axial inlets 38 towards the bearing points 37, can preferably eventually come into contact with the the bearing points 37. The axial inlets 38 can preferably make it easier to push the bearing element 25, which is radially constricted by the inner supports 32, onto the hub 1 during assembly. In accordance with an alternative embodiment of the present invention wherein there are no axial inlets 38, the bearing point 37 can preferably be hemispheric in shape. In accordance with this particular embodiment, the ring 30, after being pushed onto the hub 1, can be shrunk or compressed, so that the inner supports 32 are engaged positively in the bearing points 37. In both of the embodiments described above, the bearing points 37 preferably form a rotational retaining device for the bearing element 25 relative to the hub 1.

Figure 4:
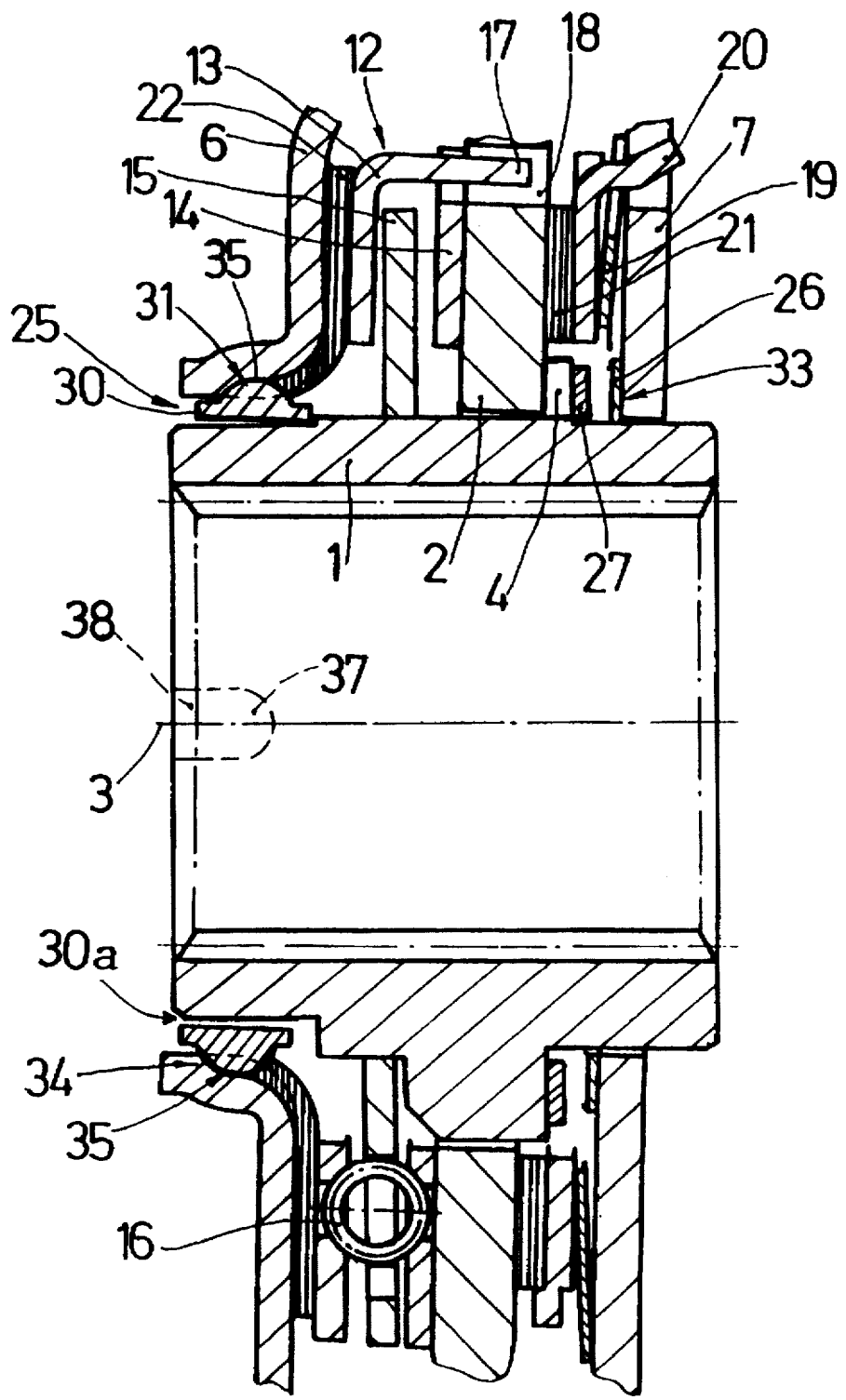
FIG. 4 shows substantially the same view as FIGS. 1 and 1A, but with the hub in an angular excursion in relation to the cover plates.

FIG. 4 shows the hub 1 in an angular excursion with respect to the cover plates 6, 7. When realized in accordance with the present invention, the bearing element 25 can preferably allow an angular excursion of the hub 1 with respect to the cover plates 6, 7, and can thus make possible the compensation of an angular offset between an input-side crankshaft (not shown) and an output-side transmission shaft (also not shown). The excursion angle of the hub 1 with respect to the cover plates 6, 7 can thereby be determined by the remaining clearance 30a between the ring 30 on its inside diameter, and the hub 1 on its outside diameter. As a result of this clearance 30a, there can preferably be a radial mobility of the hub 1 with respect to the cover plates 6, 7, so that it is also possible to compensate for a radial axis offset between the above-mentioned shafts. It should be noted that FIG. 4 shows an enlarged view of the central portion of FIG. 1, with the embodiment of the radially inner end of the cover plate 6 and the friction ring 22 of FIG. 3, wherein the view of FIG. 4 is rotated about 90 degrees from the view of FIG. 3.

Thus, in accordance with one embodiment, should the hub 1 be displaced angularly with respect to the cover plates 6, 7, the hub 1 can preferably pivot with respect to the cover plates 6, 7, preferably due to the hemispheric shape of the inner supports 32 and the bearing point 37, and also due to the hemispheric shape of the outer supports 31 and the guide 35. This pivoting movement preferably will not affect the position of the components of the vibration damper, and will thus not put undue pressure on the edges of these components.

Figure 1A:
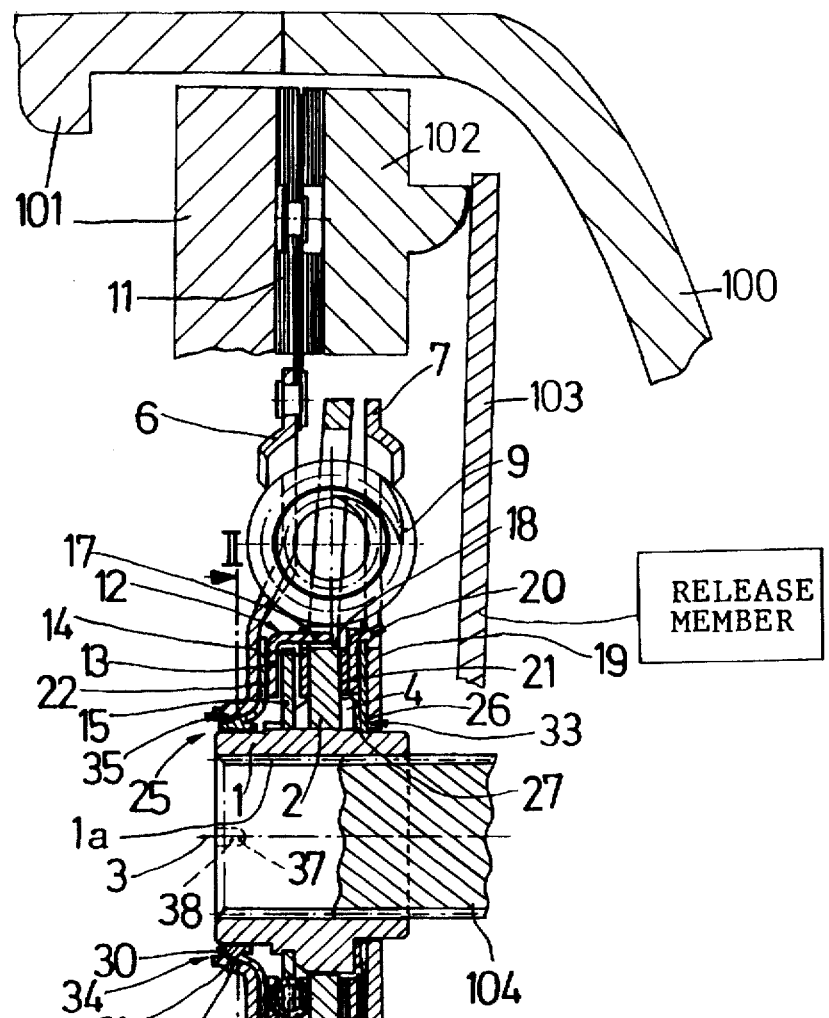
FIG. 1A shows substantially the same view as FIG. 1, but shows additional friction clutch components.

As shown in FIG. 1A, the torsional vibration damper of the present invention can preferably be utilized with a friction clutch assembly. The friction clutch assembly can preferably include a housing 100, which housing 100 can preferably enclose at least one side of the clutch plate or cover plate 6. The housing 100 can preferably be used to attach the clutch assembly to a flywheel 101, which flywheel 101 can be fastened to rotate with the crankshaft (not shown) of a motor vehicle engine. There can also be a pressure plate 102 for applying pressure to the linings 11, to engage the linings 11 with the flywheel 101. A biasing member 103 can also be provided for applying the force to the pressure plate 102. In addition, a release member, which release member is shown schematically only in FIG. 1A, can also be provided to release the biasing member 103 from the pressure plate 102 to disengage the friction linings 11 from the flywheel 101. In essence, the housing 100, flywheel 101, pressure plate 102, biasing member 103, and release member are well known and will not be discussed further herein. It should be noted that the remaining embodiments described hereinbelow can also be utilized in a friction clutch assembly as shown in FIG. 1A.

Figure 5:
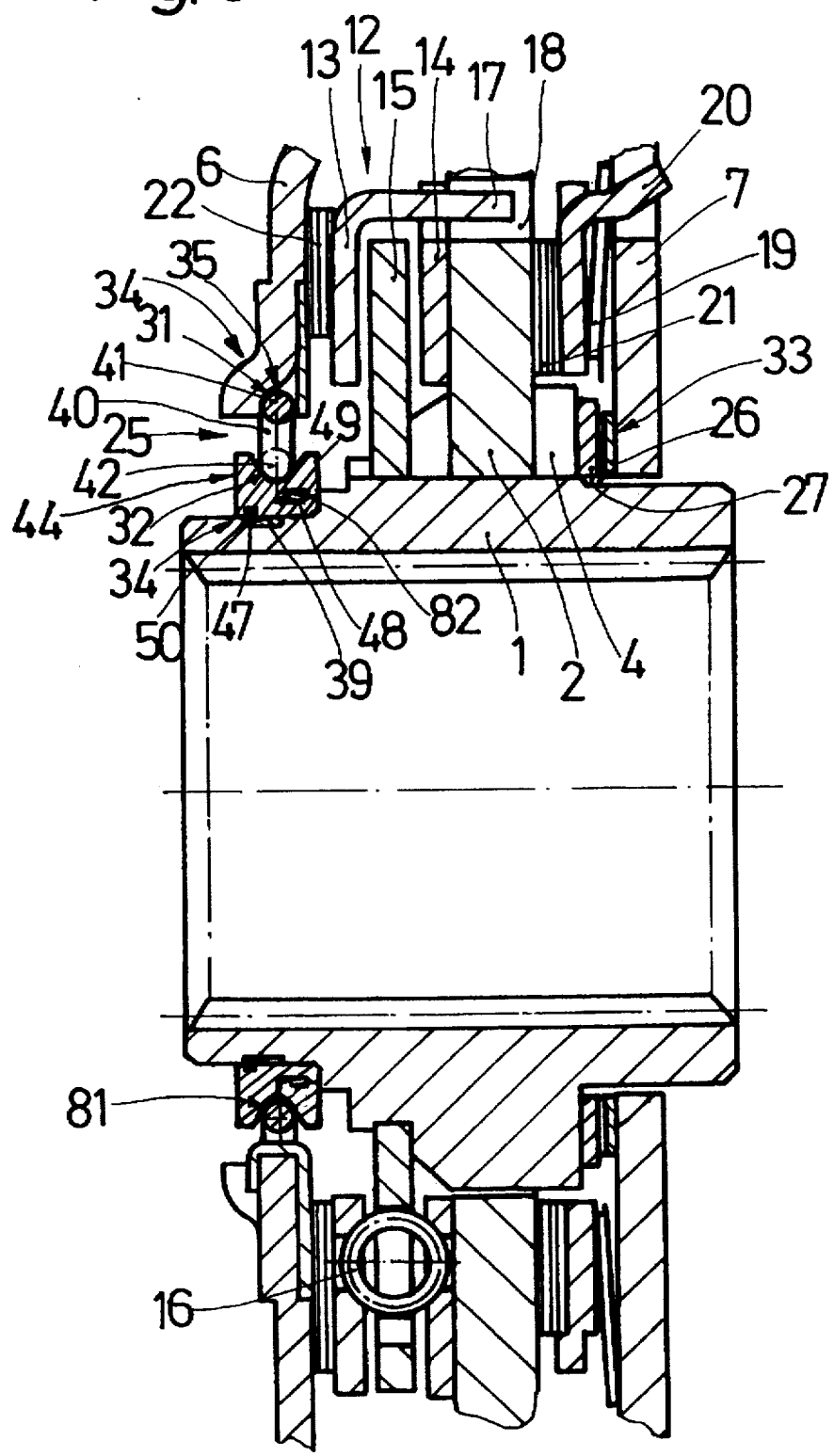
FIG. 5 is a section through a torsional vibration damper as in FIG. 1, but with an angle of intersection between the upper and the lower half of the figure of 147.5 degrees, and with a bearing element which is formed by a flexible wire ring.
Figure 5A:
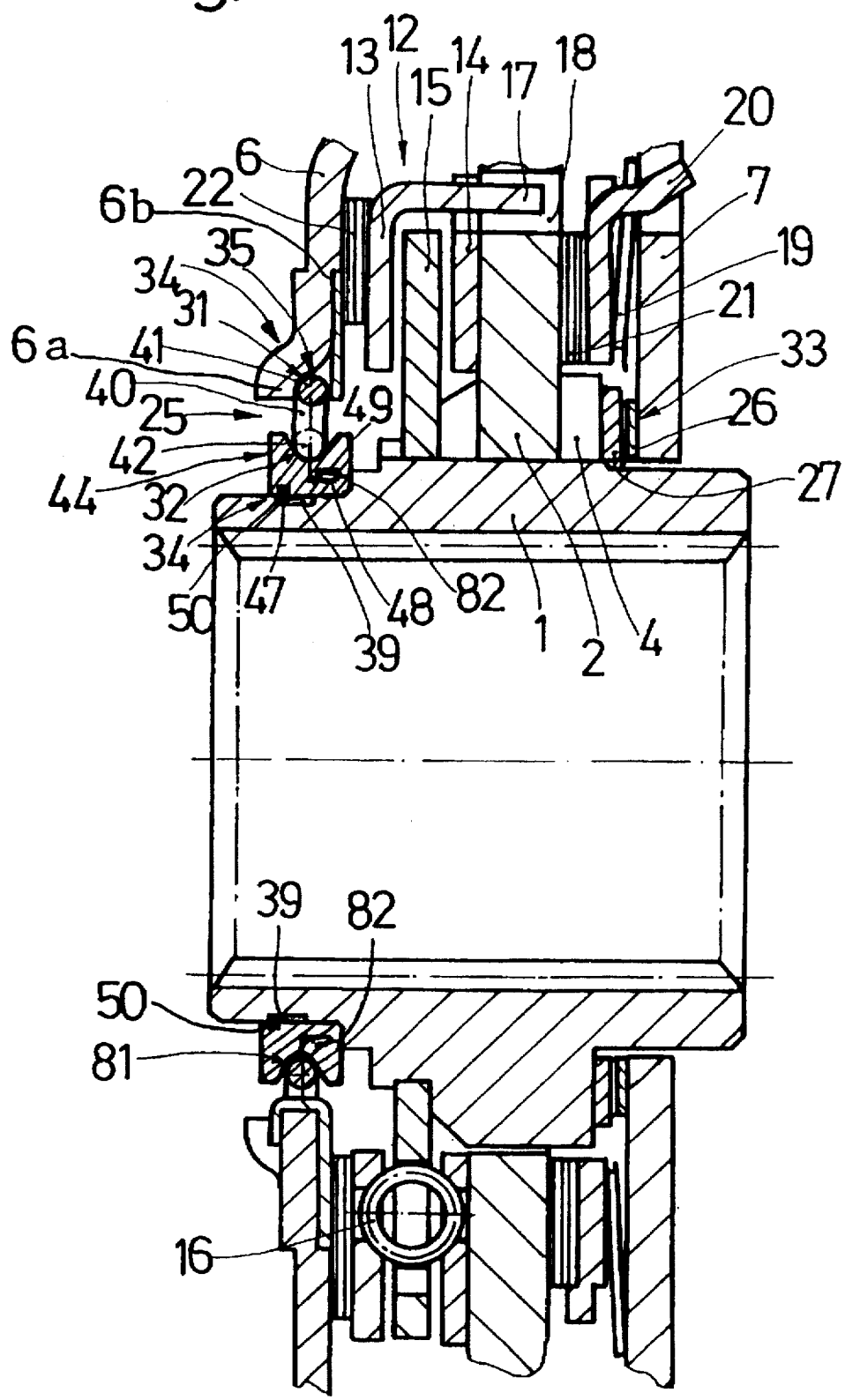
FIG. 5A shows substantially the same view as FIG. 5, but shows additional components.
Figure 6:
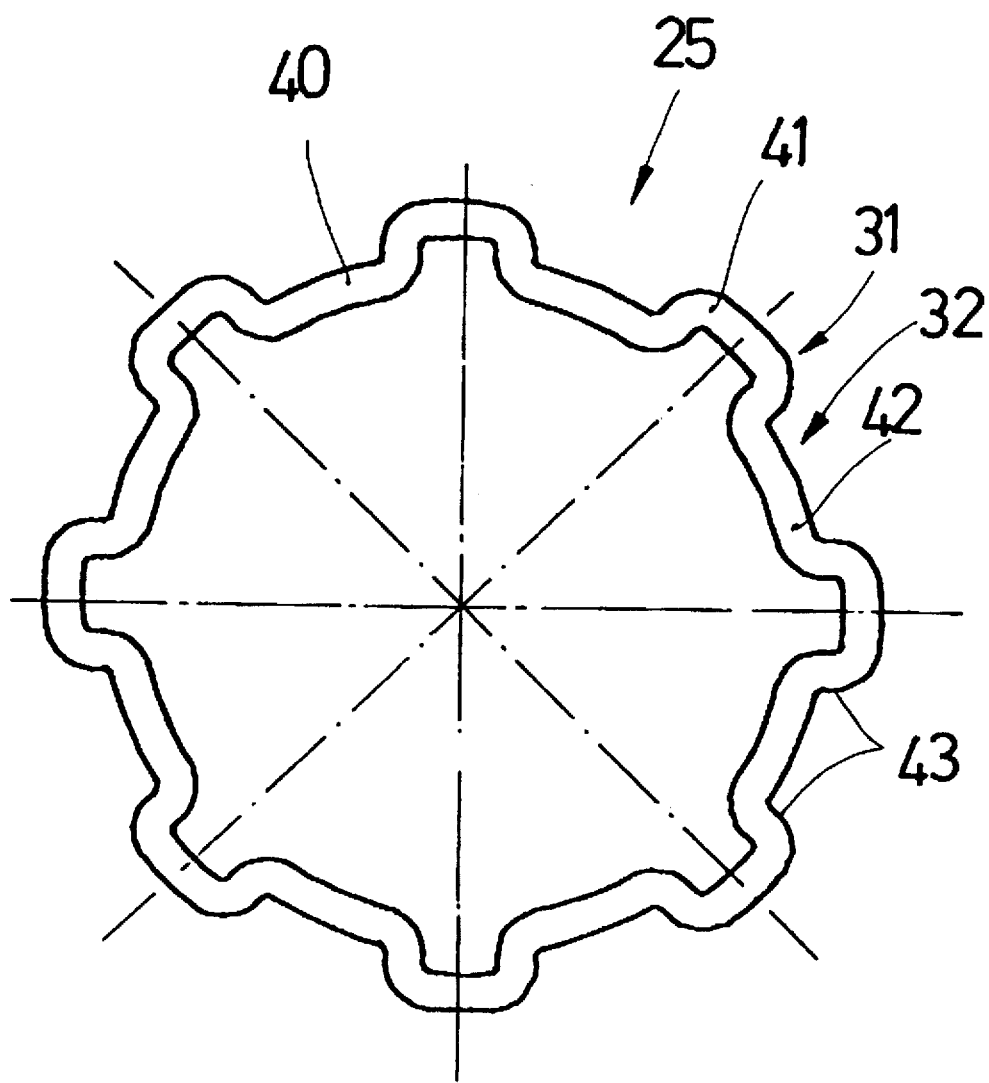
FIG. 6 shows a detail of the wire ring illustrated in FIGS. 5 and 5A.

FIGS. 5 and 5A illustrate additional embodiments of the bearing element 25. The bearing element 25 can preferably include a flexible wire ring 40 which, as shown in FIGS. 5, 5A and 6, has radial expansions or radially expanded portions 41 at predetermined angular intervals, between which portions 41 there can be radially narrower ring segments 42. The wire ring 40 can also preferably have webs or shoulders 43 (see FIG. 6) located between the expanded portions 41 and the ring segments 42. The wire ring 40 can preferably be located by means of the radial expansions 41, which can act as outer supports 31, in a guide 35 formed on the cover plate 6 on its radially inner end 6a (see FIG. 5A). The webs or shoulders 43 of the wire ring 40, which webs 43 extend between the radial expansions 41 and the ring segments 42, can preferably come into contact with corresponding stops (not shown) of the guide 35, so that there is a non-rotational connection between the cover plate 6 and the wire ring 40. The guide 35 in this embodiment of the bearing element 25 can also preferably act as an axial retaining device 34, similar to the embodiment shown in FIGS. 1–4. In accordance with one embodiment of the present invention, the stops of the guide 35 can preferably extend radially inward from the cover plate 6 and can essentially correspond in number to the number of shoulders 43 on the wire ring 40. Alternatively, there can preferably be a lesser number of stops than the number of shoulders 43 on the wire ring 40. Further, in accordance with at least one embodiment, the guide 35 can preferably be formed by the radially inward end or edge 6a (see FIG. 5A) of the cover plate 6 and an additional plate or disc 6b, which plate or disc 6b can preferably be non-rotationally attached to cover plate 6. Thus, the expanded portions 41, in accordance with one embodiment, can be disposed or clamped between radially inner end 6a and disc 6b.

The hub 1 can preferably have a hub shoulder 44 disposed on the outer circumference thereof, which hub shoulder 44 can preferably have a locator 81 in the form of a ring-shaped encircling groove. The ring segments 42 of the wire ring 40 preferably come into contact with the locator 81 of the hub shoulder 44, whereby the locator 81 can have a cross-sectional shape which essentially matches that of the wire ring 40. The hub shoulder 44 can preferably be designed as a ring fastened to the hub 1. Further, the hub shoulder or ring 44, for easier assembly on the hub 1, can be designed in the form of two ring halves 47, 48. In accordance with one embodiment, the ring halves 47, 48 can preferably be axial halves. The ring halves 47, 48 can preferably be engaged with one another by means of a snap connection 49, which snap connection 49 preferably acts in the axial direction. On one end, the ring 44 can preferably come into contact with a step or shoulder 82 of the hub 1, while on the other end the ring 44 can be axially supported by means of a shoulder 50, preferably on ring half 47, which shoulder 50 can preferably be disposed in a recess 39 formed on the hub 1. The shoulder 50 can preferably be molded radially inward on ring half 47. Fastened in this manner, the hub shoulder 44 can preferably also act as an axial retaining device 34 for the bearing element 25.

In the circumferential direction of the hub shoulder 44, it is preferably possible to have a relative rotation, restricted by friction, between the hub shoulder 44, and thus the hub 1, and the wire ring 40 which is non-rotationally connected to the cover plates 6, 7.

The wire ring 40, in accordance with this particular embodiment, can preferably be designed with a generally circular cross-section. Thus, the wire ring 40 can preferably have outer supports 31 in the form of the radial expansions 41, and can also have inner supports 32 in the form of the ring segments 42, each with a curvature extending in the axial direction. This curvature can preferably make possible a change in the angle of the wire ring 40 between the cover plate 6 and the hub 1. Consequently, with this particular embodiment of the bearing element 25, angular offsets between the crankshaft and the transmission shaft can also be compensated for. Moreover, on account of the flexible action of the wire ring 40 which can be active in the radial direction, radial axis offsets between the crankshaft and transmission shaft can also be compensated for. Thus, in accordance with one embodiment, when the hub 1 becomes angularly displaced with respect to the cover plates 6, 7, the hub 1 can preferably pivot while the cover plate 6 can essentially stay in the same position, thus avoiding angular displacements of the components of the torsional vibration damper which can cause edge pressure on these components.

To protect the wire ring 40 against wear, at those points at which a relative rotation can occur, namely, as explained above, between the hub shoulder 44 and the ring segments 42 of the wire ring 40, there can preferably be a metal/plastic connection, whereby the hub shoulder 44 can preferably be made of plastic. The other components of the torsional vibration damper shown in FIGS. 5 and 5A are essentially the same as that shown in FIG. 1 and will therefore not be discussed in further detail here.

Figure 7:
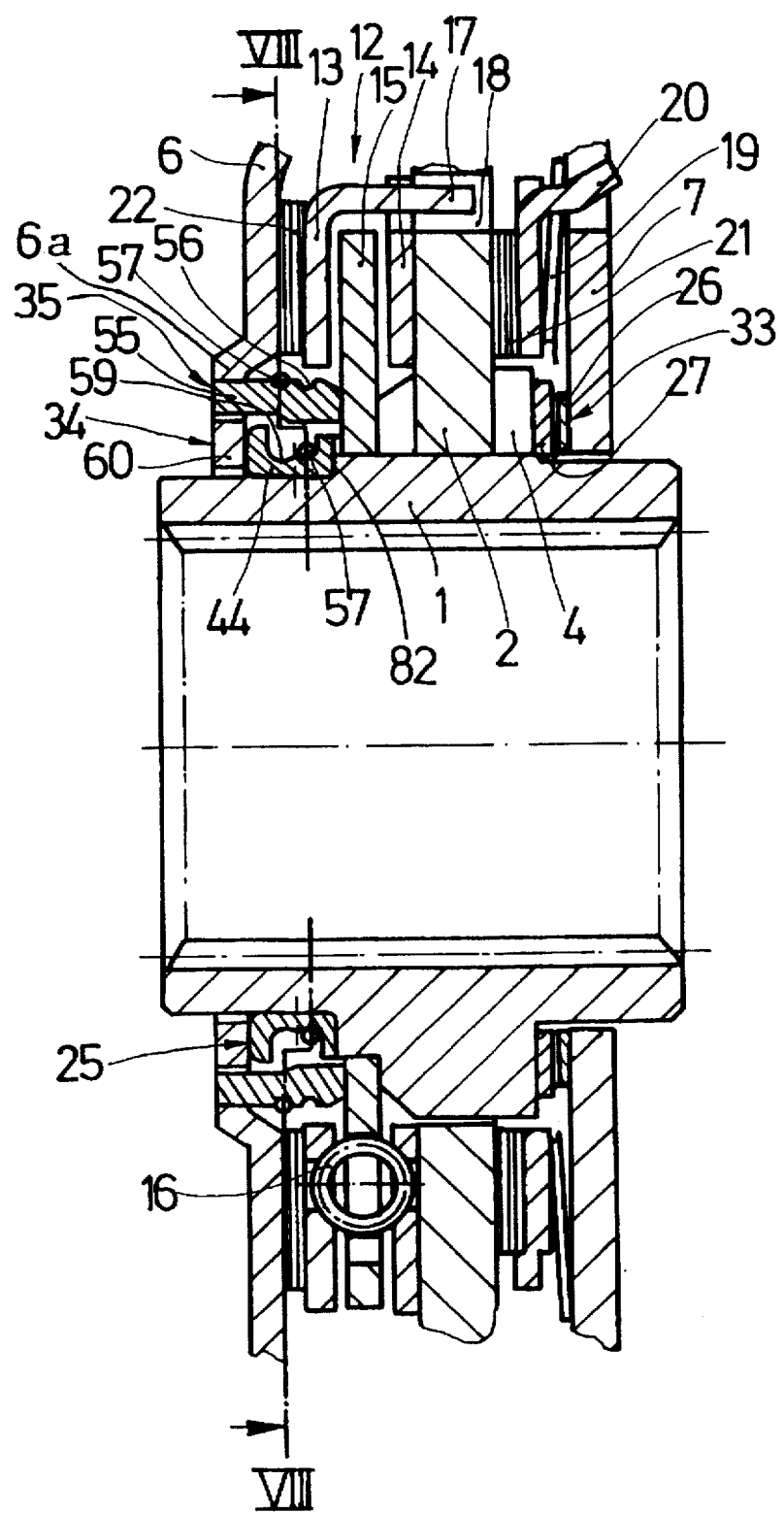
FIG. 7 shows a longitudinal section through a torsional vibration damper with a bearing element between the cover plate and hub, which bearing element has tension elements for locating tension bands.

FIG. 7 illustrates an additional embodiment of the present invention in which tension elements 55 (see also FIGS. 8, 8B, 9, and 9B) can preferably be fastened to the radially inner end 6a of the cover plate 6, and which tension elements 55 can be offset by about 90 degrees from one another. These tension elements 55 can preferably have grooves 56, which grooves 56 encircle the hub 1 and are oriented essentially parallel to one another. Each of the grooves 56 can preferably be designed to guide a tension band 57, which tension band 57 can preferably be embodied by a coil tension spring or by an elastomer ring. A hub shoulder 44 having grooves 59 can preferably be fastened to the hub 1. Like the grooves 56, the grooves 59 in the hub shoulder 44 can preferably be essentially parallel to one another and can surround the hub 1. The grooves 59 can also preferably be substantially aligned with the grooves 56 of the tension elements 55. In other words, and in accordance with at least one preferred embodiment, one groove 56 can preferably be radially aligned with one groove 59, and the other groove 56 can preferably be radially aligned with the other groove 59.

For each two tension elements 55 offset by 180 degrees in relation to one another, there can preferably be a tension band 57 guided by means of the aligned grooves 56 in the two tension elements 55. In the vicinity of the hub 1, in the area between the two tension elements 55, the tension band 57 can preferably be guided along a predetermined angle in the groove 59 of the hub shoulder 44, which groove 59 is preferably radially aligned with the groove 56 of the tension element 55. In this manner, by means of the tension band 57, an elastic clamp can preferably be formed which surrounds the hub 1 on both sides. This elastic clamp can absorb the movements of the hub 1 essentially perpendicular to the connection direction of the two tension elements 55. The two additional tension elements 55 aligned essentially perpendicular to the alignment of the first tension elements 55 can preferably locate an additional tension band 57. This additional tension band 57 can preferably be guided in a plane parallel to that of the first tension band. This additional tension band 57 preferably surrounds the hub shoulder 44 in the area between the latter two tension elements 55, so that as a result of this additional tension band 57, excursions of the hub 1 perpendicular to the above-mentioned direction of movement can preferably be absorbed. As a result of the combination of the two tension bands 57, the hub 1 can accordingly be supported by the two tension bands 57 in essentially any radial excursion direction, so that the compensation of a radial axis offset between the crankshaft and the transmission shaft, and therefore between the cover plates 6, 7 and the hub 1, can be realized essentially easily due to the elasticity of the tension bands 57.

The tension bands 57, as shown in FIG. 7, can preferably be designed so that they have a generally circular cross-section with a curvature extending in the axial direction. This curvature can preferably compensate for an angular excursion of the hub 1 with respect to the cover plates 6, 7. Thus, in accordance with this configuration of the bearing element 25, the bearing element 25 can also compensate for an angular offset, possibly in addition to an axial or radial offset, between the crankshaft and the transmission shaft.

Since all the tension elements 55 can preferably be fastened in the cover plate 6, and since the tension bands 57 can be guided in correspondingly shaped grooves 56 in each of the tension elements 55, an axial retention 34 for the tension bands 57 can essentially be guaranteed at this point. Likewise, as shown in FIG. 7, the hub shoulder 44 can preferably be disposed between a step 82 on the hub 1 and a stop 60 formed radially inwardly on the cover plate 6, thus, there can preferably be an axial retaining device 34 for the bearing element 25 and for the hub shoulder 44. When the tension bands 57 are realized in the form of coil tension springs in accordance with one embodiment, the tension elements 55 and the hub shoulder 44, for the protection of the tension bands 57, can preferably be made of plastic.

Figure 8A:
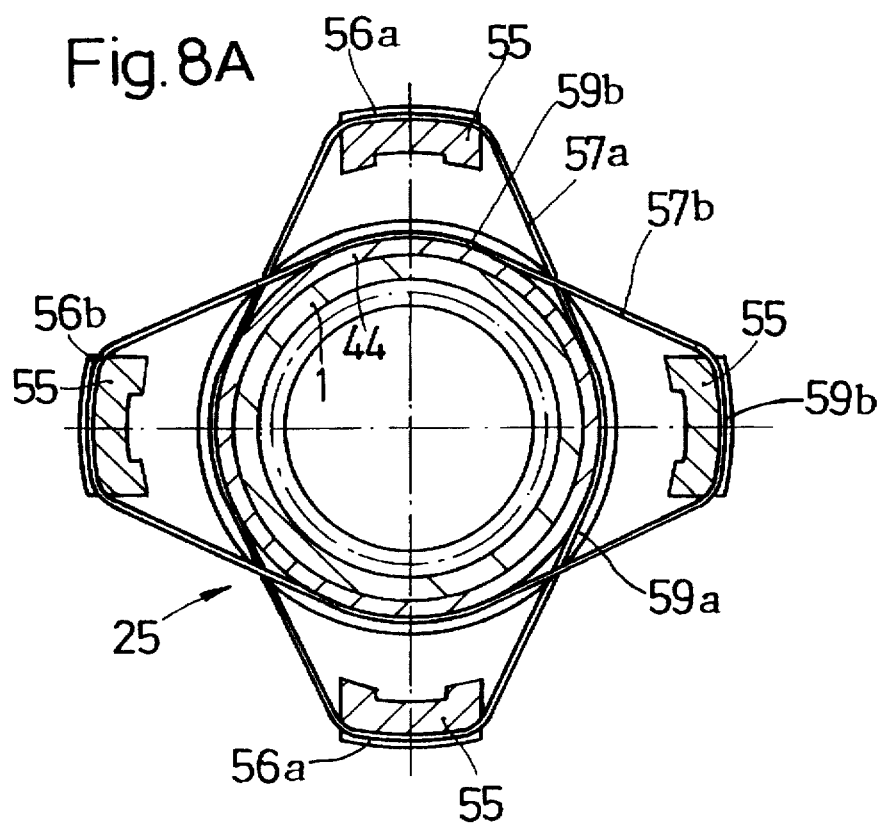
FIG. 8A shows a section along line VIIIa—VIIIa in FIG. 7A.
Figure 9A:
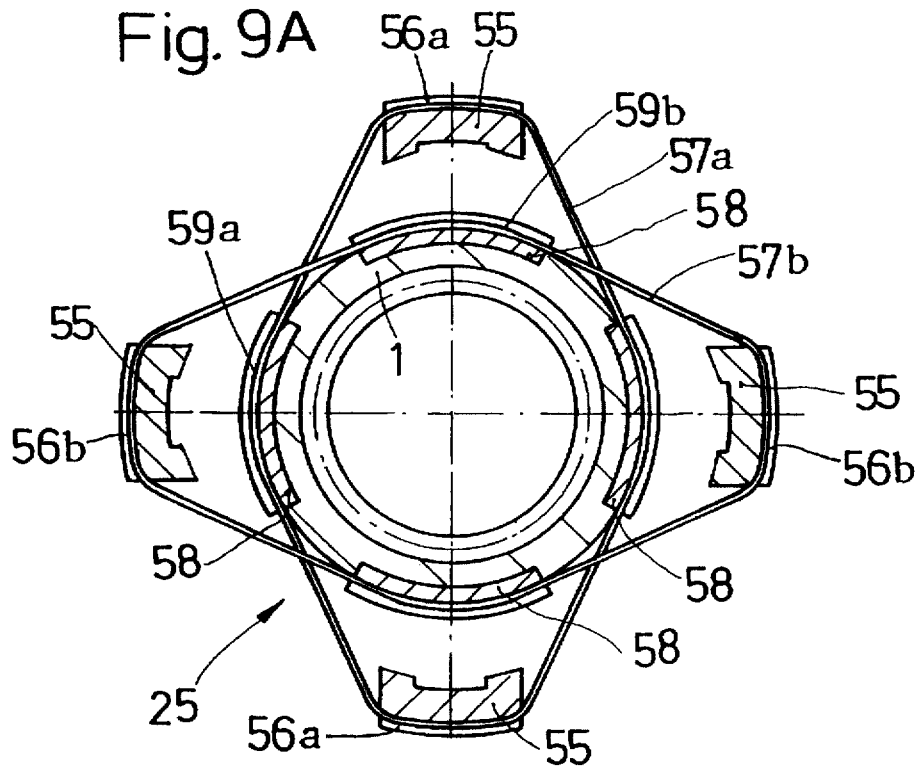
FIG. 9A shows substantially the same view as FIG. 9, but shows additional components.

In accordance with an additional embodiment, for example as shown in FIGS. 9, 9A and 9B, however, the tension bands 57 can preferably be designed as elastomer rings and the tension bands 57 can be guided essentially directly on the hub 1, which hub 1 can, in accordance with one embodiment, be made of metal. Thus, the bearing element 25 illustrated in FIGS. 9, 9A and 9B differs from the bearing elements illustrated in FIGS. 7, 8, and 8B essentially in that, instead of a ring-shaped hub shoulder 44 surrounding the hub 1, there can preferably be segments 58 in those areas of the hub 1 through which a tension band 57 is guided. In other words, and in accordance with one embodiment, instead of having a ring-shaped hub shoulder 44 completely encircling the hub 1, the hub 1 can preferably have segments 58 either integral with the hub 1, or in separate pieces fastened to the hub 1. These segments 58 can preferably guide the tension bands 57 in the areas between the two tension elements 55 spaced 180 degrees from one another.

Figure 7A:
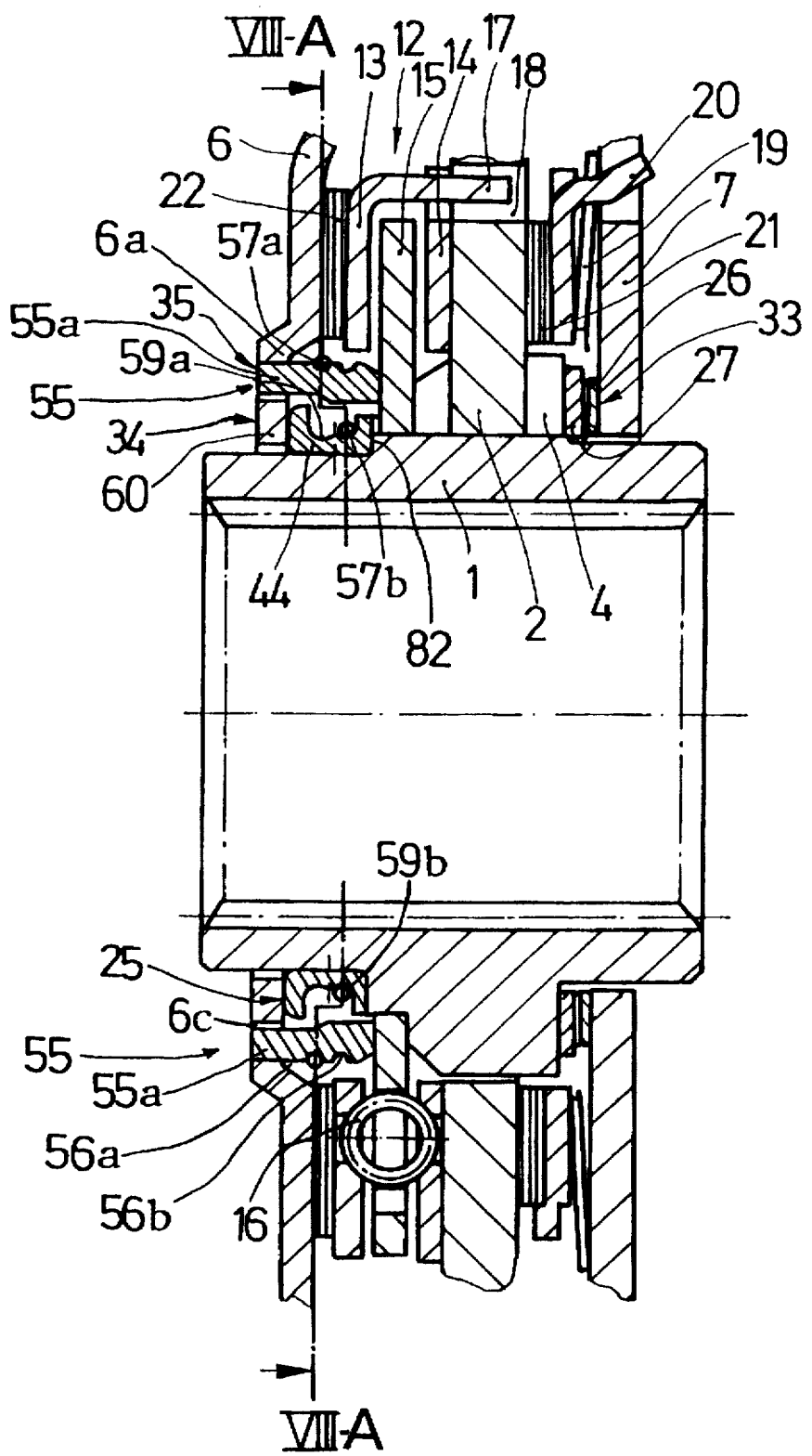
FIG. 7A shows substantially the same view as FIG. 7, but shows additional components.

In accordance with one embodiment shown in FIGS. 7A, 8A, and 9A, and as a further explanation of the above, there can preferably be four tension elements 55, each of which is preferably fastened to the radially inner end or circumference 6a of the cover plate 6. These tension elements 55 can preferably be spaced apart from one another at about 90 degree intervals around the inner circumference 6a of cover-plate 6. Each tension element 55 can preferably have two grooves 56a, 56b, which grooves 56a, 56b are preferably disposed axially adjacent one another. All of the grooves 56a, 56b in the tension elements 55 can preferably be in circumferential alignment with one another. A first tension band 57a can preferably be inserted into the grooves 56a on a first two of the tension elements 55, which are located about 180 degrees from one another. A second tension band 57b can then be inserted into the grooves 56b on the remaining second two tension elements 55, located about 90 degrees from the first two tension elements 55. Similarly, the hub shoulder 44 of the hub 1 can preferably have two grooves 59a, 59b disposed axially adjacent one another. The grooves 59a can preferably serve to guide the band 57a located in grooves 56a around the hub 1 in the intermediate areas between the first two tension elements 55 located 180 degrees from one another. The grooves 59b can likewise serve to guide the band 57b located in grooves 56b around the hub 1 in the intermediate areas between the second two tension elements 55 located 180 degrees from one another, and 90 degrees from the first two tension elements 55. Accordingly, the band 57a located in the grooves 56a can preferably serve to compensate for generally radial movements of the hub 1, preferably in the plane of connection of the tension band 57a, or in a radial direction substantially aligned with the first two tension elements 55. Further, the band 57b located in the grooves 56b can preferably serve to compensate for generally radial movements of the hub 1, in the plane of connection of the tension band 57b, or in a radial direction substantially aligned with the second two tension elements 55. Thus, the bands 57a and 57b can preferably compensate in a plurality of radial directions. The combined effect of the two tension bands 57a, 57b can preferably compensate for axial and angular movements of the hub 1 with respect to the cover plates 6, 7. The above explanation essentially also applies to the embodiment illustrated in FIG. 9A, except for the guidance of the bands 57a, 57b by the hub shoulder 44 in the intermediate portions between the two sets of tension elements 55, wherein the guidance in these areas can instead preferably be provided by the hub segments 58 having the grooves 59. The grooves 59 in the hub segments 58 can preferably be circumferentially aligned with one another.

Further, in accordance with the embodiments illustrated in FIGS. 7A, 8A and 9A, each tension element 55 can preferably have an axially extending portion 55a (see FIG. 7A), which portion 55a can preferably be engaged in a corresponding hole 6c (see FIG. 7A) in cover plate 6. In accordance with the embodiment of the tension elements 55 shown in FIGS. 8A and 9A, these portions 55a can preferably extend perpendicular to, or out of the plane of the drawing of FIGS. 8A and 9A.

In accordance with an alternative embodiment of the present invention shown in FIGS. 8B and 9B, each tension element 55 can preferably have two legs 55b which can extend radially. Each tension element 55 can also have an axially extending portion similar to portion 55a shown in FIG. 7A which engages in the recess 6c of cover plate 6.

Alternatively, the tension elements 55 shown in FIGS. 8B and 9B can preferably be rotated or turned by about 90 degrees when actually installed in the cover plate 6, in which case the legs 55b could preferably be directly fastened to the cover plate 6 and be inserted into holes 6c of the cover plate 6. In accordance with this embodiment, the legs 55b could be considered to represent axially extending portions similar to portions 55a shown in FIG. 7A.

In accordance with yet an additional alternative embodiment of the present invention, there can preferably be a ring on which the four tension elements 55 could be fastened, or alternatively, the four tension elements 55 could be integral with the ring. This ring would essentially correspond to portion 55a shown in FIG. 7A, and the tension elements 55 could be disposed at about 90 degree intervals around the circumference of the ring. The ring could then be disposed in the hole 6c of cover plate 6 and could be fastened to the inner circumferential portion 6a (see FIG. 7A) of the cover plate 6.

Figure 10:
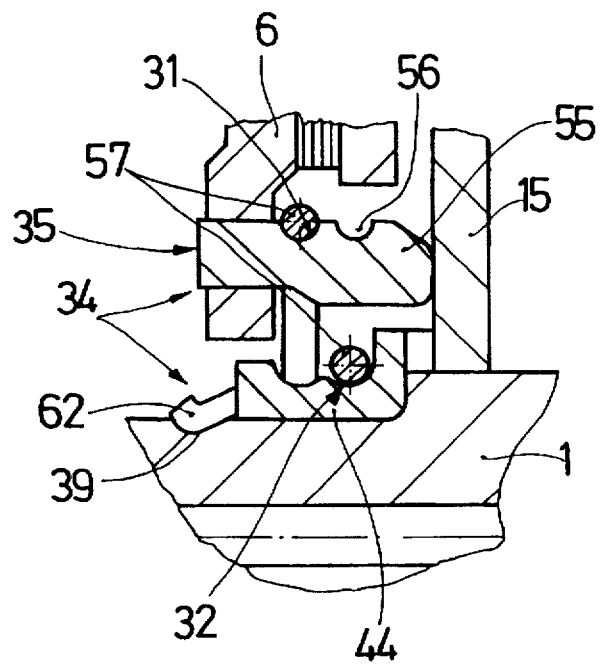
FIG. 10 shows substantially the same view as FIGS. 7 and 7A, but with a different design of the axial fastening of the bearing element.

FIG. 10 illustrates an additional embodiment of the bearing element 25, whereby this embodiment differs from the realizations illustrated in FIGS. 7–9B, in that the axial support of the hub shoulder 44 is essentially no longer provided by contact with the cover plate 6, but is instead preferably provided by means of an extension 62, which extension 62 can be engaged in a recess 39 of the hub 1.

Figure 10A:
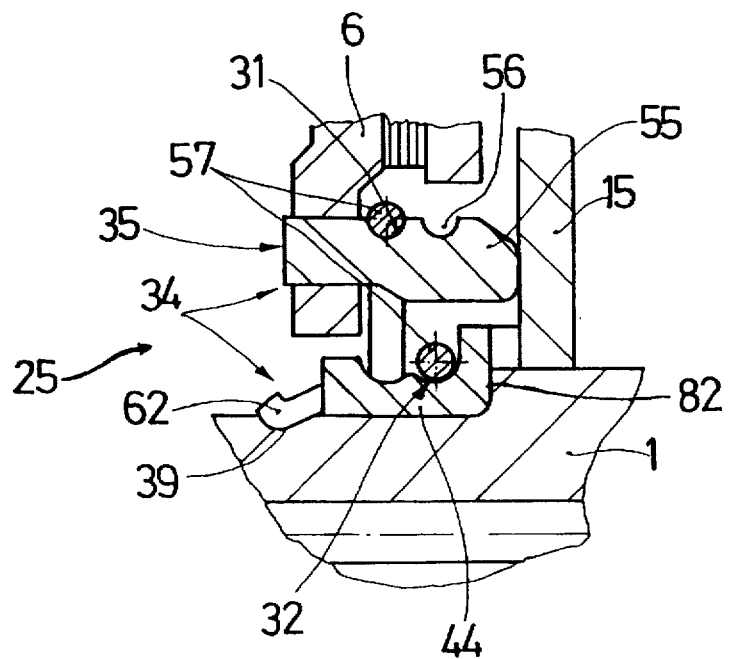
FIG. 10A shows substantially the same view as FIG. 10, but shows additional components.
Figure 11:
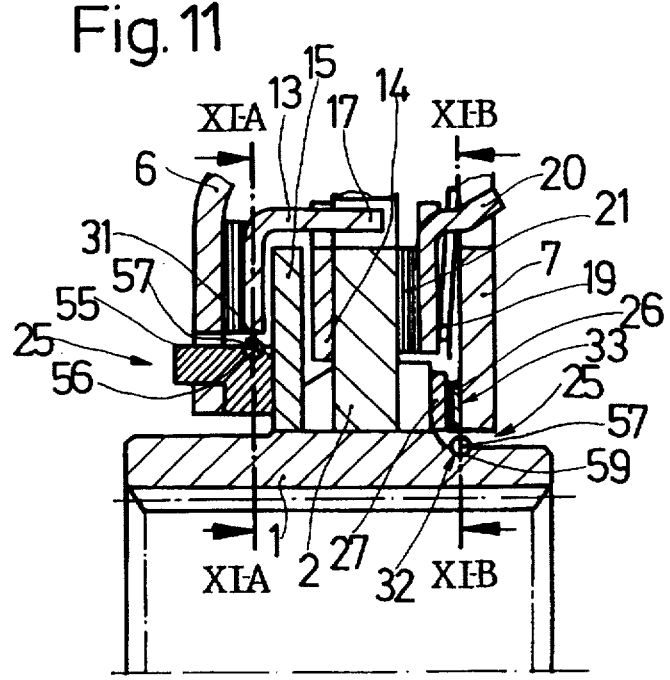
FIG. 11 shows substantially the same view as FIGS. 7 and 7A, but with bearing elements, each with a tension band, corresponding to each of the two cover plates.
Figure 11A:
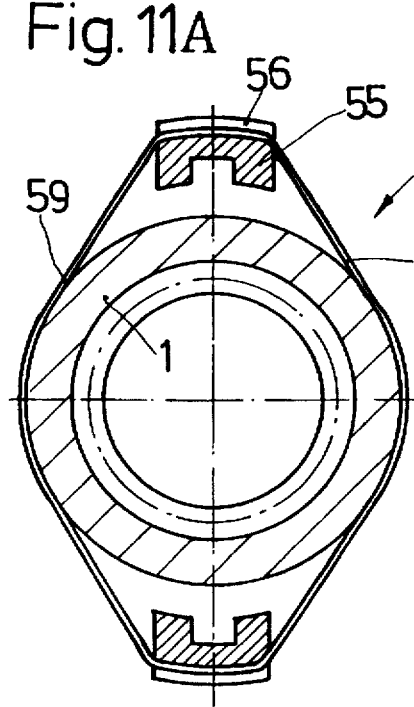
FIG. 11A shows a section along line A—A in FIG. 11.
Figure 11B:
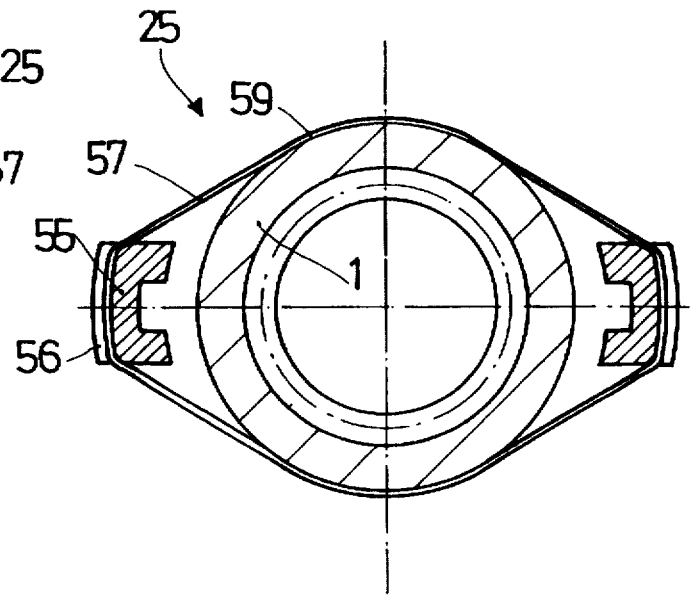
FIG. 11B shows a section along line B—B in FIG. 11.

In accordance with one embodiment shown in FIG. 10A, the shoulder 44 can preferably be axially fixed on the hub 1 by means of step 82, and by means of an extension 62 of the shoulder 44, which extension 62 can be engaged in a corresponding recess 39 in the hub 1. The recess 39 can preferably be a continuous groove disposed about the entire circumference of the hub 1, or there can be a plurality of recesses 39 located at spaced intervals on the circumference of the hub 1. Likewise, there can be a single extension 62, or a plurality of extensions 62. If a plurality of recesses 39 and extensions 62 are used, the location of these recesses 39 and extensions 62 can preferably correspond to one another. Alternatively, the extension 62 can preferably be a continuous extension along shoulder 44, in which case a continuous recess 39 on the hub 1 may be preferable.

In the versions of the embodiments illustrated in FIGS. 7 to 10A, the two tension bands 57 can preferably each be oriented at a minimum axial distance from one another. This arrangement can have the advantage that in the event of excursions of the hub 1 with respect to the cover plates 6, 7, regardless of the direction of the excursion, the force introduced can essentially always be absorbed by means of the smallest possible lever arm on one of the two tension bands 57.

An additional design which differs from the embodiments described above is illustrated in FIGS. 11, 11A, 11B, 11D, 11E and 11C, in which two tension elements 55 can preferably be attached to the first cover plate 6, and two tension elements 55 offset by about 90 degrees in relation to the first two tension elements 55 can be attached to the second cover plate 7. The tension bands 57 guided by means of these tension elements 55 can be realized in the form of elastomer rings, which rings can preferably each be guided essentially directly on the hub 1 in area between two tension elements 55 located 180 degrees from one another. Excursions of the hub 1 along a first radial direction can be restricted by means of the tension band 57 on the cover plate 6, and excursions of the hub 1 perpendicular to the above-mentioned excursions along a second radial direction perpendicular to the first radial direction can be restricted by the tension band 57 corresponding to the second cover plate 7. In accordance with this embodiment with two bearing elements 25 on each side of the hub disc 2, the hub 1 can also preferably execute excursions in essentially any radial direction relative to the cover plates 6 and 7.

In other words, and in accordance with at least one embodiment similar to the embodiments shown in FIGS. 7–9B, the two tension bands 57 can preferably work in combination with one another to compensate for angular excursions of the hub 1 with respect to the cover plates 6, 7, thereby preferably preventing edge pressure on the components of the torsional vibration damper. Further, the hub 1 in accordance with this embodiment can preferably have grooves 59 disposed essentially directly in the outer circumferential surface of the hub 1. These grooves 59 can preferably be in the form of rings, with one ring disposed on one side of the hub 1 adjacent cover plate 6, and another ring disposed the other side of the hub 1 adjacent cover plate 7. In addition, these grooves 59 or rings can preferably be disposed axially from one another and substantially parallel to one another.

In accordance with at least one embodiment as shown in FIGS. 11C, 11D, and 11E, each of the tension elements 55 can preferably have legs 55b which can extend radially towards the axis 3 of the hub 1. Further, each of the tension elements 55 can also have an axially extending portion 55a, which portion 55a can preferably be engaged in recess 6c of the cover plate 6 (see FIG. 11C). This axial portion 55a can preferably be used to fasten the tension element 55 to the cover plate 6. The same can essentially be true for the tension elements 55 fastened to cover plate 7, that is, the attachment of the tension elements 55 to cover plate 7 can preferably be the same as the attachment of the other tension elements 55 corresponding to cover plate 6. Cover plate 7 can also preferably have holes, in which axially extending portions 55a can preferably be engaged. Further, as shown in FIGS. 11C, 11D, and 11E, there can preferably be a tension band 57a on the cover plate 6 and a tension band 57b on cover plate 7. As discussed above, the tension elements 55 could essentially be disposed directly on the inner circumferences of the cover plates 6 and 7, or alternatively there could be a ring which is fastened to the cover plates 6, 7, on which ring the tension elements 55 could be disposed. Alternatively, the tension elements 55 could be integral with the ring.

Figure 12:
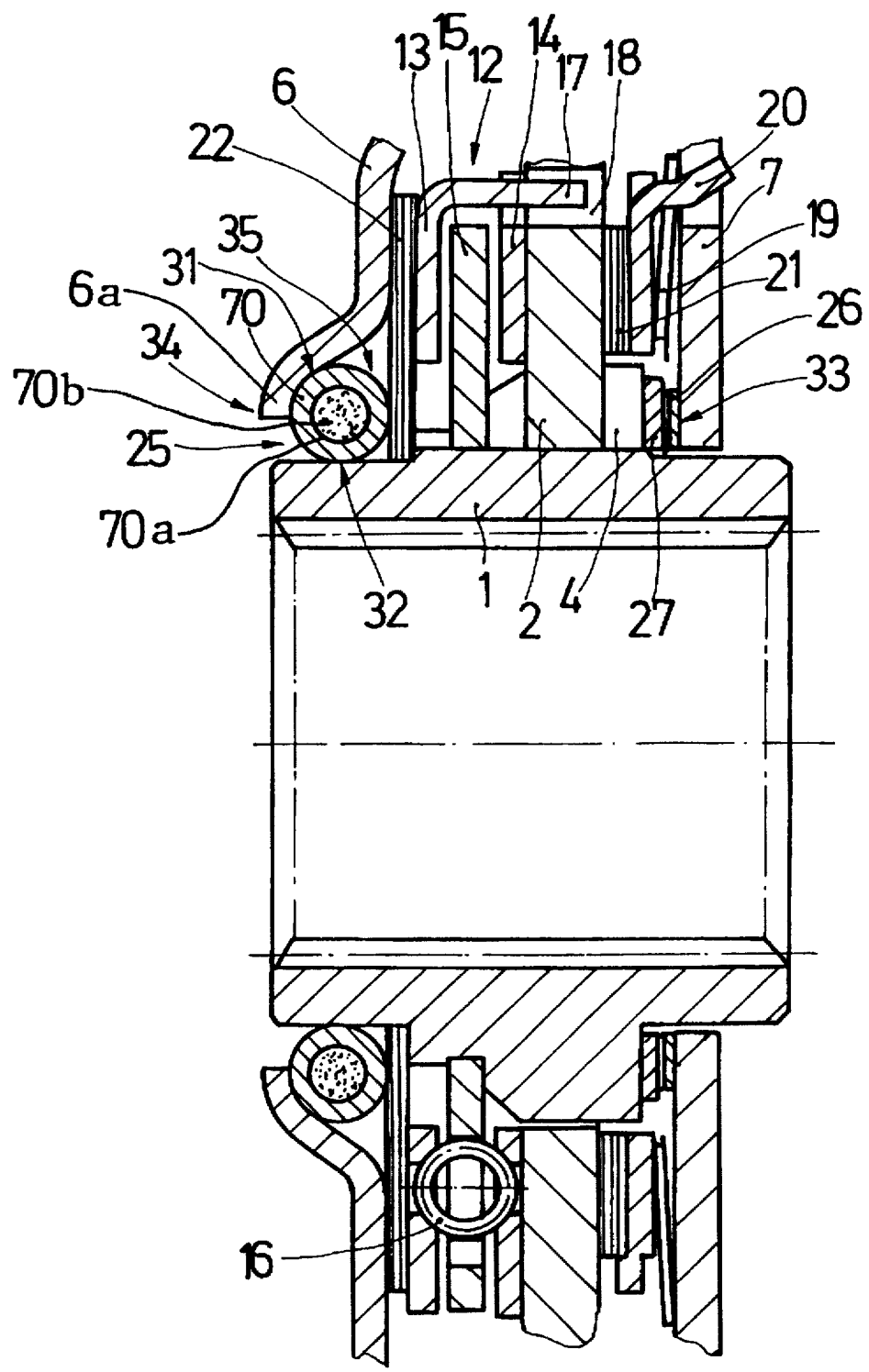
FIG. 12 is a longitudinal section through a torsional vibration damper with a bearing element in the form of an elastomer ring.

FIG. 12 shows yet an additional embodiment of the bearing element 25 in accordance with the present invention. The bearing element 25 in this embodiment can preferably be an elastomer ring 70 which surrounds the hub 1. The elastomer ring 70 can preferably be in contact over a portion of its circumference with the cover plate 6, and by means of another portion of its circumference with the hub 1. Between the radially inner end 6a of the cover plate 6 and friction ring 22, a guide 35 can preferably be formed, which guide 35 can act as an axial retaining device 34 for the ring 70. The ring 70 can preferably be realized with an essentially circular cross-section, so that both in the area of contact with the cover plate 6 and also in the area of contact with the hub 1, the curvature in the axial direction required for a pivoting movement of the hub 1 with respect to the cover plates 6 and 7 is preferably present.

The ring 70 can preferably be designed as a relatively thin-walled hose having an outer tubular part 70a, and an interior tubular part 70b can preferably be filled with a pressure or damping medium. This realization can have the advantage that in the event of a purely radial excursion, for example, the ring can be more flexible and thus a radial axis offset can be more effectively compensated than with a ring which is made of solid material. The latter realization wherein the ring is made of solid material, however, can have the advantage that the ring can be particularly heavy duty and economical.

In all of the embodiments of the bearing element 25 described above, the above-mentioned spring 26 can preferably act as a restoring means 33 in the event of an angular excursion of the hub 1 with respect to the cover plates 6 and 7. In other words, and in accordance with one embodiment of the present invention, under no-load conditions, the hub 1 and the cover plates 6, 7 can preferably be substantially concentric with respect to one another. However, when the hub 1 displaces angularly, the concentricity between the cover plates 6, 7 and the hub 1 can be lost. Thus, the restoring means 33 can preferably substantially restore the concentricity between the hub 1 and the cover plates 6, 7.

Regardless of the configuration of the bearing element 25 in the embodiments described above, care should be taken with the functional elements of the torsional vibration damper, such as, for example, the hub disc 15 of the idle spring device 12. For example, an excursion of the hub 1 relative to the cover plates 6 and 7 can result in a change in the angle of the hub disc 15, e.g. with respect to the cover plates 13 and 14. Care should be taken such that this angular displacement of the hub disc 15 does not result in undesirable contact, and thus undesirable friction, between the hub disc 15 and the cover plate, 13 on the one hand, and the hub disc 15 and the cover plate 14 on the other hand. Such contact can preferably be prevented by maintaining a specified minimum distance between such functional elements or by floating arrangement, i.e. an axially movable arrangement of the hub disc 15.

One feature of the invention resides broadly in the torsional vibration damper for a motor vehicle friction clutch, consisting of a hub with hub disc, cover plates located one on either side of the hub disc and non-detachably fastened together, and which can be rotated by a specified amount with respect to the hub disc against the force of springs, whereby the radial guidance of the parts which can rotate in relation to one another is provided by preferably one cover plate and a bearing element inserted in a central hole in the cover plate, which bearing element permits a limited relative radial movement of the cover plate with respect to the hub, characterized by the fact that the bearing element 25 is designed, in at least each of its areas of contact with the hub 1 and the cover plate 6, 7, with a support 31, 32 with a convex curvature in the axial direction of the hub 1 for a change in the angle of the bearing element 25 with respect to the cover plate 6, 7 and of the hub 1 with respect to the bearing element 25, and which interacts with an axial retaining device 34 which limits an axial displacement of the bearing element 25 with respect to the cover plate 6, 7 and hub 1 during this change of angle, which axial retaining device 34 is realized on at least one of the two contact elements (cover plate 6, 7, hub 1.

Another feature of the invention resides broadly in the torsional vibration damper characterized by the fact that the bearing element 25 interacts with restoration means 33 which counteract a change of angle, which restoration means are engaged on one end on the hub 1 and on the other end in one of the cover plates 6, 7.

Yet another feature of the invention resides broadly in the torsional vibration damper characterized by the fact that the axial retaining device 34 is formed by a guide 35 which is provided on the radially inner end of the cover plate 6, 7 and which is used to locate the bearing element 25 in its radially outer area.

Still another feature of the invention resides broadly in the torsional vibration damper characterized by the fact that the axial retaining device 34 is formed by a recess 39 provided in the hub 1, in which recess 39 at least one extension 50, 62 of the bearing element 25 is engaged.

A further feature of the invention resides broadly in the torsional vibration damper characterized by the fact that the bearing element 25 is designed with an extension 50, 62, preferably extending in the axial direction, which is engaged in a recess 39 on the hub 1.

Another feature of the invention resides broadly in the torsional vibration damper characterized by the fact that the bearing element 25 is formed by a ring 30 which surrounds the hub 1 with clearance, which ring, on its outside circumference, has external hemispherically-shaped supports 31 offset from one another by an angle of 180 degrees, which are engaged in the guide 35 formed on the cover plate 6, 7, and whereby the ring is provided on its inside diameter with two likewise hemispherically-shaped inner supports 32 located angularly approximately centrally between each two outer supports 31, which inner supports 32 are each located in a bearing point 37 realized in the vicinity of the circumference of the hub 1.

Yet another feature of the invention resides broadly in the torsional vibration damper characterized by the fact that the hub 1, in the vicinity of the engagement of the radially inner supports 32 of the bearing element 25 is realized with an axial inlet or channel 38 which empties into a bearing point 37.

Still another feature of the invention resides broadly in the torsional vibration damper characterized by the fact that the bearing element 25 consists of a wear-resistant plastic.

A further feature of the invention resides broadly in the torsional vibration damper characterized by the fact that the bearing element 25 is formed by a flexible wire ring 40 with radial expansions 41 acting as external supports 31 at specified angular intervals, which are engaged in the guide 35 formed on the cover plate 6, 7, while the ring segments 42 which run between each two respective expansions 41 are formed in a hub-side locator 81.

Another feature of the invention resides broadly in the torsional vibration damper characterized by the fact that the hub-side locator 81 is formed on a hub shoulder 44 with ring halves 47, 48 divided axially, which can be brought into an effective snap connection 49 with one another in the axial direction.

Yet another feature of the invention resides broadly in the torsional vibration damper characterized by the fact that the hub shoulder 44 is made of wear-resistant and heat-resistant plastic.

Still another feature of the invention resides broadly in the torsional vibration damper characterized by the fact that the bearing element 25, at some radial distance from the hub 1 at predetermined angular intervals on the cover plate 6, 7 has tension elements 55 of the guide 35 with grooves 56 designed on the outside diameter, whereby each two tension elements 55 offset from one another by an angle of 180 degrees are designed to locate a tension band 57 which acts as a support 31, 32, which comes into contact in the middle of the distance between the tension elements 55 with the hub 1 in a corresponding groove 59 which runs along its outer circumference.

A further feature of the invention resides broadly in the torsional vibration damper characterized by the fact that the individual tension elements 55 are each offset from one another by 90 degrees.

Another feature of the invention resides broadly in the torsional vibration damper characterized by the fact that both the tension elements 55 of the guide 35 and also the hub 1 are designed each with two grooves 56, 59 parallel to one another, each of which is used to locate a tension band 57.

Yet another feature of the invention resides broadly in the torsional vibration damper characterized by the fact that the grooves 59 in the guide 35 and in the hub 1 which are each used to locate a tension band 57 each have a circular cross section, to match the preferably circular cross section of the tension band 57.

Still another feature of the invention resides broadly in the torsional vibration damper characterized by the fact that the hub 1 supports a hub shoulder 44, which is designed with interruptions, whereby the remaining segments 58 essentially each cover the remaining portion of the hub 1 in the center of the space between two tension elements 55.

A further feature of the invention resides broadly in the torsional vibration damper characterized by the fact that two tension elements 55 opposite one another on one of the cover plates 6 and the two other tension elements 55 opposite one another on the other cover plate 7 are offset by 90 degrees with respect to the first tension elements.

Another feature of the invention resides broadly in the torsional vibration damper characterized by the fact that the hub shoulder 44 is secured in the axial direction by an axially outer stop 60 running radially inward of the cover plate 6, and is designed with a crown or spherical portion on its side facing this stop 60.

Yet another feature of the invention resides broadly in the torsional vibration damper characterized by the fact that the tension bands 57 are formed by coil tension springs.

Still another feature of the invention resides broadly in the torsional vibration damper characterized by the fact that the tension bands 57 are formed by elastomer rings.

A further feature of the invention resides broadly in the torsional vibration damper characterized by the fact that the tension elements 55, like the hub shoulder 44, are made of plastic.

Another feature of the invention resides broadly in the torsional vibration damper characterized by the fact that the bearing element 25 is formed by an elastomer ring 70 which surrounds the hub 1, whereby the side of the ring 70 which faces the cover plate 6, 7 acts as an outer support 31 and its side facing the hub 1 as an inner support 32.

Yet another feature of the invention resides broadly in the torsional vibration damper characterized by the fact that the elastomer ring 70 is designed as a thin-walled hose and is filled with a pressure medium.

Still another feature of the invention resides broadly in the torsional vibration damper characterized by the fact that the elastomer ring 70 is made of solid material.

A further feature of the invention resides broadly in the torsional vibration damper with at least one hub disc and at least one load friction disc which is axially supported on the hub disc, which load friction disc has at least one energy storage device which provides an axial force, characterized by the fact that the axial distance between each two functional elements 13, 14, 15 located on the hub 1, between which a frictional connection is undesirable, is greater than the maximum axial offset of one of these functional elements 13, 14, 15 with respect to the other in the event of an angular change of the hub 1 relative to the cover plates 6, 7.

Another feature of the invention resides broadly in the torsional vibration damper characterized by the fact that at least some of the functional elements 13, 14, 15 are mounted in a floating manner in the axial direction.

Some examples of torsional vibration dampers for use in friction clutches which incorporate a bearing element may be disclosed in the following U.S. Pat. Nos.: 4,890,712 to Maucher et al., entitled "Torsional Vibration Damping Device for Clutch Plates"; 4,763,767 to Lanzarini et al., entitled "Torsional Damper Device"; 4,453,838 to Loizeau, entitled "Torsion Damping Assembly and Radially Deformable Bearing Therefor"; 5,246,398 to Birk et al., entitled "Clutch Disk With Torsional Damper Device"; and 5,117,959 to Graton, entitled "Torsion Damping Device, In Particular for Automotive Vehicles".

Some examples of vibration dampers in which the present invention may be incorporated may be disclosed by the following U.S. Pat. Nos.: 5,230,415 to Ament et al., entitled "Clutch Plate for a Motor Vehicle Friction Clutch"; 5,251,736 to Jeppe et al., entitled "Clutch Plate for a Motor Vehicle Friction Clutch"; 5,238,096 to Ament et al., entitled "Clutch Plate for a Motor Vehicle Friction Clutch"; 4,687,086 to Ward, entitled "Torsional Vibration Dampers"; and 4,787,612 to Ball et al., entitled "Torsional Vibration Damper".

Some additional examples of torsional vibration dampers and components associated therewith which may be utilized in accordance with the embodiments of the present invention, may be found in the following U.S. Pat. Nos.: 5,016,744, which issued to Fischer et al. on May 21, 1991; 4,433,771, which issued to Caray on Feb. 28, 1984; 4,684,007, which issued to Maucher on Aug. 4, 1987; 4,697,682, which issued to Alas et al. on Oct. 6, 1987; 4,890,712, which issued to Maucher et al. on Jan. 2, 1990; and 4,651,857, which issued to Schraut et al. on Mar. 24, 1987.

Some examples of transmissions in which the present invention may be incorporated may be disclosed by the following U.S. Pat. Nos.: 5,199,316 to Hoffman, entitled "Fully-Synchronized Multiple Speed Manual Transmission for Motor Vehicles"; 4,458,551 to Winter, entitled "Manual Transmission"; and 3,858,460 to Porter et al., entitled "Four Speed Manual Transmission and Control".

Some examples of clutch assemblies which could possibly be used in conjunction with the present invention may be disclosed in the following U.S. Pat. Nos.: 4,684,007 to Maucher, entitled "Clutch Plate"; 4,635,780 to Wiggen, entitled "Clutch Disc for a Motor Vehicle Friction Clutch"; and 4,651,857 to Schraut et al., entitled "Clutch Disc Unit for a Motor Vehicle Clutch".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 09 254.7, filed on Mar. 18, 1994, having inventors Norbert Ament, Reinhard Feldhaus, Joachim Lindner, Klaus Memmel, Jörg Sudau, and Michael Weiss, and DE-OS P 44 09 254.7 and DE-PS P 44 09 254.7, are hereby incorporated by reference as if set forth in their entirety herein.

19

The invention as described hereinabove in the context of the preferred embodiments is not to be taken as limited to all of the provided details thereof, since modifications and variations thereof may be made without departing from the spirit and scope of the invention.

We claim:

1. A friction clutch for a motor vehicle, said friction clutch comprising:

a housing;

a clutch plate disposed within said housing, said clutch plate defining an axis of rotation and an axial direction parallel to the axis of rotation;

pressure plate means for applying an axial force to said clutch plate, said pressure plate being disposed within said housing and being movable in the axial direction;

flywheel means for transferring rotational force to said clutch plate;

said clutch plate comprising a torsional vibration damper, said torsional vibration damper comprising:

a hub, said hub having means for engaging a transmission shaft;

a hub disc disposed about said hub and extending radially away from said hub, said hub disc having a first side and a second side facing away from one another;

a first cover plate disposed adjacent said first side of said hub disc;

a second cover plate disposed adjacent said second side of said hub disc;

at least one of said first cover plate and said second cover plate comprising friction lining means for engaging with said pressure plate and said flywheel means upon engagement of said friction clutch;

said first cover plate and said second cover plate being relatively rotatable about said hub with respect to said hub disc;

means for guiding at least one of said first cover plate and said second cover plate with respect to said hub;

said means for guiding comprising means for compensating for angular displacements of said hub with respect to said at least one of said first cover plate and said second cover plate, said means for compensating being disposed between, and making contact with, said at least one of said first cover plate and said second cover plate and said hub; and means for axially retaining said means for guiding with respect to said hub and said at least one of said first cover plate and said second cover plate.

2. The friction clutch according to claim 1 wherein said means for axially retaining is disposed on at least one of:

said at least one of said first cover plate and said second cover plate; and said hub.

3. The friction clutch according to claim 2 wherein:

said means for compensating comprises a bearing element, said bearing element having at least one portion having a convex curvature to compensate for angular displacements of said hub with respect to said at least one of said first cover plate and said second cover plate; and said convex curvature of said at least one portion making contact with said at least one of said first cover plate and said second cover plate and said hub.

4. The friction clutch according to claim 3 wherein:

said first cover plate and said second cover plate each have a first position with respect to said hub wherein

20 substantially no load is placed upon said first cover plate and said second cover plate;

said first cover plate and said second cover plate each have a second position with respect to said hub upon an angular displacement of said hub;

said torsional vibration damper further comprises:

means for restoring said first positions of said first cover plate and said second cover plate with respect to said hub after an angular displacement of said hub; and said restoring means being disposed between said hub disc and the other one of said at least one of said first cover plate and said second cover plate.

5. The friction clutch according to claim 4 wherein:

said means for axially retaining is disposed on said at least one of said first cover plate and said second cover plate;

said at least one of said first cover plate and said second cover plate has an outer circumference and an inner circumference disposed within said outer circumference, said inner circumference being disposed adjacent said hub; and said means for axially retaining comprises a guide disposed on said inner circumference of said at least one of said first cover plate and said second cover plate.

6. The friction clutch according to claim 5 wherein:

said hub has an outer circumference and an inner circumference disposed within said outer circumference of said hub, said outer circumference of said hub having a diameter;

said bearing element further comprises a ring, said ring having an outer circumference and an inner circumference disposed within said outer circumference of said ring;

said inner circumference of said ring having a diameter greater than said diameter of said outer circumference of said hub such that said inner circumference of said ring surrounds said outer circumference of said hub with a clearance;

said at least one portion having said convex curvature comprises two outer supports disposed on said outer circumference of said ring, said outer supports each having a hemispherical shape;

each of said outer supports being engaged in said guide of said at least one of said first cover plate and said second cover plate; and each of said outer supports being disposed on said ring at about 180° from one another.

7. The friction clutch according to claim 6 wherein:

said at least one portion having said convex curvature further comprises two inner supports disposed on said inner circumference of said ring, said inner supports each having a hemispherical shape;

each of said inner supports being disposed on said ring at about 180° from one another, and each of said inner supports being offset from each of said outer supports by about 90°; and said hub further comprises a recess disposed in said outer circumference of said hub, each of said inner supports being engaged in said recess of said hub, said recess forming a bearing surface for each of said inner supports.

8. The friction clutch according to claim 7 wherein said hub further comprises:

a first end and a second end disposed a substantial axial distance from one another;

an inlet groove disposed in said outer circumference of said hub, said inlet groove extending from said first end of said hub towards said second end of said hub;

said inlet groove having a first end portion and a second end portion, said first end portion being disposed at said first end of said hub;

said second end portion of said inlet groove is disposed nearer to said second end of said hub than said first end portion of said inlet groove, said second end portion of said inlet groove comprising said recess and said bearing surface; and said inlet groove has a cross-section defined perpendicular to the axis of rotation, said cross-section of said inlet groove having a hemispherical shape substantially matching said hemispherical shape of said inner supports of said ring.

9. The friction clutch according to claim 8 wherein:

said ring comprises a wear-resistant plastic material;

said at least one of said first cover plate and said second cover plate is said first cover plate;

said first cover plate has an outer portion extending from said outer circumference of said first cover plate towards said inner circumference of said first cover plate;

said inner circumference of said first cover plate comprises a flange disposed substantially perpendicular with respect to at least a portion of said outer portion of said first cover plate;

said guide of said first cover plate is disposed in said flange, said guide comprising a recess extending into said flange in a direction away from said hub;

said recess of said guide comprises a hemispherical shape substantially matching said hemispherical shape of said outer supports of said ring;

said restoring means comprises a spring;

said torsional vibration damper further comprises:

a first friction ring attached to said inner circumference of said first cover plate, said friction ring forming a portion of said recess of said guide;

at least one rivet connecting said first cover plate and said second cover plate to one another, said at least one rivet being disposed adjacent said friction lining means;

an idle damping device, said idle damping device being disposed between said first cover plate and said hub disc, said idle damping device comprising:

an additional hub disc, said additional hub disc being non-rotatably attached to said hub and having a first side and a second side facing away from one another;

a third cover plate and a fourth cover plate, said third cover plate being disposed on said first side of said additional hub disc and said fourth cover plate being disposed on said second side of said additional hub disc;

said third cover plate, said fourth cover plate, and said additional hub disc all having windows disposed therein;

at least one coil sprang disposed in said windows of said third cover plate, said fourth cover plate and said additional hub disc;

said third cover plate comprising a plurality of tabs extending in the axial direction towards said fourth cover plate;

said hub disc comprises a plurality of recesses extending in the axial direction, said plurality of tabs of said third cover plate extending into a corresponding one of said plurality of recesses of said hub disc;

said fourth cover plate being disposed radially inward of said plurality of tabs of said third cover plate;

said torsional vibration damper further comprising:

a spring plate supported on said second cover plate;

a second friction ring supported by said hub disc;

an angle ring disposed between said second friction ring and said spring plate, said angle ring being connected to said second cover plate in a non-rotational but axially movable manner, said angle rang for applying pressure to said second friction ring;

said spring plate being configured for generating an axial force via said second cover plate and said at least one connecting rivet to said first cover plate, the axial force of said spring plate then being transmitted from said first cover plate via said first friction ring to said third cover plate;

said third cover plate, said fourth cover plate, and said additional hub disc being disposed spaced-apart from one another along said hub such that the axial distance between each of said third cover plate, said fourth cover plate and said additional hub disc is greater than a maximum axial offset of one of said third cover plate, said fourth cover plate, and said additional hub disc with respect to the others of these components, upon an angular displacement of said hub with respect to said first cover plate and said second cover plate;

at least one of said third cover plate, said fourth cover plate and said additional hub disc being mounted in a floating manner in the axial direction; and said first friction ring, said second friction ring, and said spring plate together forming a load damping device.

10. The friction clutch according to claim 4 wherein:

said means for axially retaining comprises a recess extending radially into said hub; and said bearing element further comprises at least one projection extending from said bearing element towards said hub, said at least one projection engaging with said recess of said hub.

11. The friction clutch according to claim 10 wherein:

said means for axially retaining is disposed on both of:

said at least one of said first cover plate and said second cover plate; and said hub;

said at least one of said first cover plate and said second cover plate has an outer circumference and an inner circumference disposed within said outer circumference, said inner circumference being disposed adjacent said hub; and said means for axially retaining further comprises a guide disposed on said inner circumference of said at least one of said first cover plate and said second cover plate.

12. The friction clutch according to claim 11 wherein:

said hub has an outer circumference and an inner circumference disposed within said outer circumference of said hub;

said bearing element further comprises a flexible ring, said flexible ring being disposed about said outer circumference of said hub and comprising said at least one portion having said convex curvature;

said at least one portion having said convex curvature comprises a plurality of portions each having said convex curvature, said plurality of portions having said convex curvature comprising:

a first plurality of ring segments, said first plurality of ring segments projecting in a radially outward direction;

a second plurality of ring segments, said second plurality of ring segments projecting in a radially inward direction;

each of said second plurality of ring segments being disposed in an alternating manner with ones of said first plurality of ring segments;

said second plurality of ring segments being disposed radially inwardly of said first plurality of ring segments; and said first plurality of ring segments being engaged in said guide of said at least one of said first cover plate and said second cover plate.

13. The friction clutch according to claim 12 wherein:

said first plurality of ring segments each have a U-shape, said U-shape being formed by three leg portions, said three leg portions being first, second and third leg portions;

said first and second leg portions being disposed parallel to one another and said third leg portion being disposed between and connecting said first and second leg portions, said third leg portion being substantially perpendicular to said first and second leg portions;

said second plurality of ring segments each extending between and connecting a first leg portion of one of said first plurality of ring segments to a second leg portion of a neighboring one of said first plurality of ring segments, each of said second plurality of ring segments being disposed concentrically within said third leg portions of ones of said first plurality of ring segments;

said bearing element further comprises:

an additional ring disposed concentrically about said outer circumference of said hub and being fixedly fastened to said outer circumference of said hub;

said additional ring being divided axially into a first ring half and a second ring half;

said additional ring comprising:

an outer circumference and an inner circumference disposed within said outer circumference of said additional ring;

means for fastening said first and second ring halves to one another, said means for fastening comprising a snap connection;

said first ring half comprising said at least one projection engaging with said recess of said hub;

a groove disposed along and encircling said outer circumference of said additional ring, said groove extending into said outer circumference of said additional ring;

said second plurality of ring segments engaging with said groove;

said groove having a cross-sectional shape substantially matching said convex curvature of said second plurality of ring segments; and a wear resistant and heat resistant plastic material;

said flexible ring comprises a flexible wire ring;

said recess of said hub is a first recess;

said hub further comprises a second recess disposed adjacent said first recess, said second recess extending radially into said hub;

said second ring half being disposed adjacent said second recess;

said first recess extends further into said hub than said second recess such that said first and second recesses together form a step-like configuration in said outer circumference of said hub;

said at least one of said first cover plate and said second cover plate is said first cover plate;

said first cover plate has an outer portion extending from said outer circumference of said first cover plate towards said inner circumference of said first cover plate;

said inner circumference of said first cover plate comprises a flange disposed at a substantial angle with respect to said outer portion of said first cover plate;

said guide of said first cover plate is formed by said flange;

said flange comprises a portion having a shape substantially matching said convex curvature of said first plurality of ring segments;

said restoring means comprises a spring;

said torsional vibration damper further comprises:

a first friction ring attached to said inner circumference of said first cover plate;

at least one rivet connecting said first cover plate and said second cover plate to one another, said at least one rivet being disposed adjacent said friction lining means;

an idle damping device, said idle damping device being disposed between said first cover plate and said hub disc, said idle damping device comprising:

an additional hub disc, said additional hub disc being non-rotatably attached to said hub and having a first side and a second side facing away from one another;

a third cover plate and a fourth cover plate, said third cover plate being disposed on said first side of said additional hub disc and said fourth cover plate being disposed on said second side of said additional hub disc;

said third cover plate, said fourth cover plate, and said additional hub disc all having windows disposed therein;

at least one coil spring disposed in said windows of said third cover plate, said fourth cover plate and said additional hub disc;

said third cover plate comprising a plurality of tabs extending in the axial direction towards said fourth cover plate;

said hub disc comprises a plurality of recesses extending in the axial direction, said plurality of tabs of said third cover plate extending into a corresponding one of said plurality of recesses of said hub disc;

said fourth cover plate being disposed radially inward of said plurality of tabs of said third cover plate;

said torsional vibration damper further comprising:

a spring plate supported on said second cover plate;

a second friction ring supported by said hub disc;

an angle ring disposed between said second friction ring and said spring plate, said angle ring being connected to said second cover plate in a non-rotational but axially movable manner, said angle ring for applying pressure to said second friction ring;

said spring plate being configured for generating an axial force via said second cover plate and said at least one connecting rivet to said first cover place, the axial force of said spring plate then being transmitted from said first cover plate via said first friction ring to said third cover plate;

said third cover plate, said fourth cover plate, and said additional hub disc being disposed spaced-apart from one another along said hub such that the axial distance between each of said third cover plate, said fourth cover plate and said additional hub disc is greater than a maximum axial offset of one of said third cover plate, said fourth cover plate, and said additional hub disc with respect to the others of these components, upon an angular displacement of said hub with respect to said first cover plate and said second cover plate;

at least one of said third cover plate, said fourth cover plate and said additional hub disc being mounted in a floating manner in the axial direction; and said first friction ring, said second friction ring, and said spring plate together forming a load damping device.

14. The friction clutch according to claim 5 wherein said bearing element further comprises:

at least two tensioning elements, said at least two tensioning elements being a first tensioning element and a second tensioning element disposed on said inner circumference of said at least one of said first cover plate and said second cover said first tensioning element and said second tensioning element being disposed about 180° from one another;

each of said first tensioning element and said second tensioning element having a first side and a second side facing away from one another, each of said first and second sides of said said first and second tensioning elements being disposed substantially parallel with respect to the axis of rotation;

said first sides of said first and second tensioning elements facing away from said hub;

said first sides of said first and second tensioning elements each comprising a groove extending radially into said first and second tensioning elements, each of said grooves being disposed in a common radial plane; and at least one tension band extending about said hub and being engaged in each of said grooves of said first and second tensioning elements.

15. The friction clutch according to claim 14 wherein said hub further comprises:

an outer circumference and an inner circumference disposed within said outer circumference of said hub;

a groove disposed along said outer circumference of said hub, said groove of said hub being disposed radially inwardly from said first and second tensioning elements;

said groove of said hub being disposed in said common radial plane of said grooves of said first and second tensioning elements;

said at least one tension band comprising said at least one portion of said bearing element having said convex curvature; and said at least one tension band engaging in said groove of said hub, said at least one tension band contacting said groove of said hub in an area of said hub about midway between said first and second tensioning elements.

16. The friction clutch according to claim 15 wherein said bearing element further comprises:

two additional tensioning elements, said two additional tensioning elements being third and fourth tensioning elements disposed on said inner circumference of said at least one of said first cover plate and said second cover plate;

each of said third tensioning element and said fourth tensioning element having a first side and a second side facing away from one another, each of said first and second sides of said said third and fourth tensioning elements being disposed substantially parallel with respect to the axis of rotation;

said first sides of said third and fourth tensioning elements facing away from said hub;

said first sides of said third and fourth tensioning elements each comprising a groove extending radially into said third and fourth tensioning elements, each of said grooves being disposed in a common radial plane disposed parallel to said common radial plane of said grooves of said first and second tensioning elements;

an additional tension band extending about said hub and being engaged in each of said grooves of said third and fourth tensioning elements;

said hub further comprises an additional groove disposed along said outer circumference of said hub, said groove of said hub being disposed radially inwardly from said third and fourth tensioning elements;

said additional groove of said hub being disposed in said common radial plane of said grooves of said third and fourth tensioning elements;

said additional tension band comprising a convex curvature; and said additional tension band engaging in said additional groove of said hub, said additional tension band contacting said additional groove of said hub in an area of said hub about midway between said third and fourth tensioning elements.

17. The friction clutch according to claim 16 wherein:

said groove and said additional groove of said hub each comprise a cross-section having a shape substantially matching said convex curvature of each of said at least one tension band and said additional tension band;

said grooves of said first and second tensioning elements and said grooves of said third and fourth tensioning elements each comprise a cross-section having a shape substantially matching said convex curvature of said at least one tension band and said additional tension band;

said hub further comprises one of a) and b):

a) a hub shoulder in the form of a ring disposed around and attached to said outer circumference of said hub, said hub shoulder being disposed radially inward from said tensioning elements;

said groove and said additional groove of said hub both extending radially into said hub shoulder;

said hub shoulder comprising a plastic material; and b) four segmented hub shoulders, each of said four segmented hub shoulders having a semi-circular shape;

said groove and said additional groove of said hub both extending radially into each of said four segmented hub shoulders; and said four segmented hub shoulders comprising a plastic material;

said at least one tension band and said additional tension band each comprising one of c) and d):

c) a coil spring; and d) an elastomer ring;

said first, second, third, and fourth tensioning elements each comprising a plastic material;

said guide of said at least one of said first cover plate and said second cover plate comprises a stop portion extending radially inwardly from said inner circumference of said at least one of said first cover plate and said second cover plate towards said outer circumference of said hub;

said stop portion contacts said hub shoulder to prevent axial movement of said hub shoulder, said hub shoulder having a surface disposed substantially radially and contacting said stop portion;

said at least one of said first cover plate and said second cover plate is said first cover plate;

said first cover plate has an outer portion extending from said outer circumference of said first cover plate towards said inner circumference of said first cover plate;

said inner circumference of said first cover plate comprises a flange disposed at a substantial angle with respect to at least a portion of said outer portion of said first cover plate;

said guide of said first cover plate being formed at least partially by said flange;

said restoring means comprises a spring;

said torsional vibration damper further comprises:
  a first friction ring attached to said inner circumference of said first cover plate, said friction ring forming a portion of said guide;
  at least one rivet connecting said first cover plate and said second cover plate to one another, said at least one rivet being disposed adjacent said friction lining means;
  an idle damping device, said idle damping device being disposed between said first cover plate and said hub disc, said idle damping device comprising:
    an additional hub disc, said additional hub disc being non-rotatably attached to said hub and having a first side and a second side facing away from one another;
    a third cover plate and a fourth cover plate, said third cover plate being disposed on said first side of said additional hub disc and said fourth cover plate being disposed on said second side of said additional hub disc;
    said third cover plate, said fourth cover plate, and said additional hub disc all having windows disposed therein;
    at least one coil spring disposed in said windows of said third cover plate, said fourth cover plate and said additional hub disc;
    said third cover plate comprising a plurality of tabs extending in the axial direction towards said fourth cover plate;

said hub disc comprises a plurality of recesses extending in the axial direction, said plurality of tabs of said third cover plate extending into a corresponding one of said plurality of recesses of said hub disc;

said fourth cover plate being disposed radially inward of said plurality of tabs of said third cover plate;

said torsional vibration damper further comprising:
  a spring plate supported on said second cover plate;
  a second friction ring supported by said hub disc;
  an angle ring disposed between said second friction ring and said spring plate, said angle ring being connected to said second cover plate in a non-rotational but axially movable manner, said angle ring for applying pressure to said second friction ring;

said spring plate being configured for generating an axial force via said second cover plate and said at least one connecting rivet to said first cover plate, the axial force of said spring plate then being transmitted from said first cover plate via said first friction ring to said third cover plate;

said third cover plate, said fourth cover plate, and said additional hub disc being disposed spaced-apart from one another along said hub such that the axial distance between each of said third cover plate, said fourth cover plate and said additional hub disc is greater than a maximum axial offset of one of said third cover plate, said fourth cover plate, and said additional hub disc with respect to the others of these components, upon an angular displacement of said hub with respect to said first cover plate and said second cover plate;

at least one of said third cover plate, said fourth cover plate and said additional hub disc being mounted in a floating manner in the axial direction; and said first friction ring, said second friction ring, and said spring plate together forming a load damping device.

18. The friction clutch according to claim 14 wherein:

said at least one of said first cover plate and said second cover plate is said first cover plate;

said second cover plate comprises an outer circumference and an inner circumference disposed within said outer circumference of said second cover plate;

said at least one tension band comprises said at least one portion of said bearing element having said convex curvature;

said bearing element further comprises:
  two additional tensioning elements, said two additional tensioning elements being third and fourth tensioning elements disposed on said inner circumference of said second cover plate;
  each of said third tensioning element and said fourth tensioning element having a first side and a second side facing away from one another, each of said first and second sides of said said third and fourth tensioning elements being disposed substantially parallel with respect to the axis of rotation;
  said first sides of said third and fourth tensioning elements facing away from said hub;
  said first sides of said third and fourth tensioning elements each comprising a groove extending radially into said third and fourth tensioning elements, each of said grooves being disposed in a common radial plane disposed parallel to said common radial plane of said grooves of said first and second tensioning elements;
  an additional tension band extending about said hub and being engaged in each of said grooves of said third and fourth tensioning elements; and
  said additional tension band comprises a convex curvature.

19. The friction clutch according to claim 18 wherein:

said third and fourth tensioning elements being disposed on said inner circumference of said second cover plate at about 180° from one another, and each of said third and fourth tensioning elements being offset from said each of said first and second tensioning elements by about 90°;

said grooves of said first and second tensioning elements and said grooves of said third and fourth tensioning elements each comprise a cross-section having a shape substantially matching said convex curvature of said at least one tension band and said additional tension band;

said at least one tension band and said additional tension band each comprising one of c) and d):
c) a coil spring; and
d) an elastomer ring;

said first, second, third, and fourth tensioning elements each comprising a plastic material;

said restoring means comprises a spring;

said torsional vibration damper further comprises:
a first friction ring attached to said inner circumference of said first cover plate;
at least one rivet connecting said first cover plate and said second cover plate to one another, said at least one rivet being disposed adjacent said friction lining means;
an idle damping device, said idle damping device being disposed between said first cover plate and said hub disc, said idle damping device comprising:
an additional hub disc, said additional hub disc being non-rotatably attached to said hub and having a first side and a second side facing away from one another;
a third cover plate and a fourth cover plate, said third cover plate being disposed on said first side of said additional hub disc and said fourth cover plate being disposed on said second side of said additional hub disc;
said third cover plate, said fourth cover plate, and said additional hub disc all having windows disposed therein;
at least one coil spring disposed in said windows of said third cover plate, said fourth cover plate and said additional hub disc;
said third cover plate comprising a plurality of tabs extending in the axial direction towards said fourth cover plate;

said hub disc comprises a plurality of recesses extending in the axial direction, said plurality of tabs of said third cover plate extending into a corresponding one of said plurality of recesses of said hub disc;

said fourth cover plate being disposed radially inward of said plurality of tabs of said third cover plate;

said torsional vibration damper further comprising:
a spring plate supported on said second cover plate;
a second friction ring supported by said hub disc;
an angle ring disposed between said second friction ring and said spring plate, said angle ring being connected to said second cover plate in a non-rotational but axially movable manner, said angle ring for applying pressure to said second friction ring;
said spring plate being configured for generating an axial force via said second cover plate end said at least one connecting rivet to said first cover plate, the axial force of said spring plate then being transmitted from said first cover plate via said first friction ring to said third cover plate;

said third cover plate, said fourth cover plate, and said additional hub disc being disposed spaced-apart from one another along said hub such that the axial distance between each of said third cover plate, said fourth cover plate and said additional hub disc is greater than a maximum axial offset of one of said third cover plate, said fourth cover plate, and said additional hub disc with respect to the others of these components, upon an angular displacement of said hub with respect to said first cover plate and said second cover plate;

at least one of said third cover plate, said fourth cover plate and said additional hub disc being mounted in a floating manner in the axial direction; and said first friction ring, said second friction ring, and said spring plate together forming a load damping device.

20. The friction clutch according to claim 5 wherein:
said hub comprises an outer circumference and an inner circumference disposed within said outer circumference of said hub;
said bearing element comprises an elastomer ring having an outer circumference and an inner circumference disposed within said outer circumference of said elastomer ring;
said elastomer ring comprises said at least one portion having said convex curvature; and
said inner circumference of said elastomer ring contacts said outer circumference of said hub and said outer circumference of said elastomer ring contacts said guide of said at least one of said first cover plate and said second cover plate.

21. The friction clutch according to claim 20 wherein:
said elastomer ring further comprises one of:
a thin-walled hose having an interior portion containing a pressure medium; and
a solid elastomeric material;
said at least one of said first cover plate and said second cover plate is said first cover plate;
said first cover plate has an outer portion extending from said outer circumference of said first cover plate towards said inner circumference of said first cover plate;
said inner circumference of said first cover plate comprises a flange disposed at a substantial angle with respect to at least a portion of said outer portion of said first cover plate;
said flange comprises a substantial portion of said guide of said first cover plate;
said flange comprises a shape substantially matching said convex shape of said elastomer ring;
said restoring means comprises a spring;
said torsional vibration damper further comprises:
a first friction ring attached to said inner circumference of said first cover plate, said friction ring forming a portion of said guide;
at least one rivet connecting said first cover plate and said second cover plate to one another, said at least one rivet being disposed adjacent said friction lining means;
an idle damping device, said idle damping device being disposed between said first cover plate and said hub disc, said idle damping device comprising:
an additional hub disc, said additional hub disc being non-rotatably attached to said hub and having a first side and a second side facing away from one another;
a third cover plate and a fourth cover plate, said third cover plate being disposed on said first side of said additional hub disc and said fourth cover plate being disposed on said second side of said additional hub disc;
said third cover plate, said fourth cover plate, and said additional hub disc all having windows disposed therein;
at least one coil spring disposed in said windows of said third cover plate, said fourth cover plate and said additional hub disc;

said third cover plate comprising a plurality of tabs extending in the axial direction towards said fourth cover plate;

said hub disc comprises a plurality of recesses extending in the axial direction, said plurality of tabs of said third cover plate extending into a corresponding one of said plurality of recesses of said hub disc;

said fourth cover plate being disposed radially inward of said plurality of tabs of said third cover plate;

said torsional vibration damper further comprising:
- a spring plate supported on said second cover plate;
- a second friction ring supported by said hub disc;
- an angle ring disposed between said second friction ring and said spring plate, said angle ring being connected to said second cover plate in a non-rotational but axially movable manner, said angle ring for applying pressure to said second friction ring;
- said spring plate being configured for generating an axial force via said second cover plate and said at least one connecting rivet to said first cover plate, the axial force of said spring plate then being transmitted from said first cover plate via said first friction ring to said third cover plate;

said third cover plate, said fourth cover plate, and said additional hub disc being disposed spaced-apart from one another along said hub such that the axial distance between each of said third cover plate, said fourth cover plate and said additional hub disc is greater than a maximum axial offset of one of said third cover plate, said fourth cover plate, and said additional hub disc with respect to the others of these components, upon an angular displacement of said hub with respect to said first cover plate and said second cover plate;

at least one of said third cover plate, said fourth cover plate and said additional hub disc being mounted in a floating manner in the axial direction; and said first friction ring, said second friction ring, and said spring plate together forming a load damping device.

* * * * *

UNITED STATES PATENT AND TRADEMARK OFFICE
CERTIFICATE OF CORRECTION

PATENT NO. : 5,722,525
DATED : March 3, 1998
INVENTOR(S) : Norbert AMENT, Reinhard FELDHAUS, Joachim LINDNER, Klaus MEMMEL, Jürg SUDAU, and Michael WEISS It is certified that error appears in the above-identified patent and that said Letters Patent is hereby corrected as shown below:

In column 25, line 22, Claim 14, after 'cover' insert --plate;--.

In column 29, line 53, Claim 19, after 'plate', delete "end" and insert --and--.

Signed and Sealed this

Twenty-first Day of July, 1998

Attest:

BRUCE LEHMAN

Attesting Officer

Commissioner of Patents and Trademarks